US012640313B2

(12) United States Patent
Lee et al.

(10) Patent No.: US 12,640,313 B2
(45) Date of Patent: May 26, 2026

(54) MULTI-LAYERED CERAMIC CAPACITOR INCLUDING BODY HAVING INCLINED PORTIONS

(71) Applicant: SAMSUNG ELECTRO-MECHANICS CO., LTD., Suwon-si (KR)

(72) Inventors: Taekjung Lee, Suwon-si (KR); Byoungwoo Kim, Suwon-si (KR); Sanghak Yoon, Suwon-si (KR); Yoona Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 101 days.

(21) Appl. No.: 18/586,980

(22) Filed: Feb. 26, 2024

(65) Prior Publication Data

US 2024/0387109 A1 Nov. 21, 2024

(30) Foreign Application Priority Data

May 12, 2023 (KR) ........................ 10-2023-0061902

(51) Int. Cl.
| | |
|---|---|
| *H01G 4/30* | (2006.01) |
| *H01G 4/224* | (2006.01) |
| *H01G 4/232* | (2006.01) |
| *H01G 4/12* | (2006.01) |

(52) U.S. Cl.
CPC .............. *H01G 4/30* (2013.01); *H01G 4/224* (2013.01); *H01G 4/232* (2013.01); *H01G 4/12* (2013.01)

(58) Field of Classification Search
None
See application file for complete search history.

(56) References Cited

U.S. PATENT DOCUMENTS

| | | | |
|---|---|---|---|
| 6,787,884 B2 * | 9/2004 | Hirano ................. | H05K 3/3442 |
| | | | 257/730 |
| 2017/0243697 A1 | 8/2017 | Mizuno et al. | |
| 2017/0301471 A1 | 10/2017 | Ono et al. | |
| 2018/0158608 A1 * | 6/2018 | Fujita ..................... | H01G 4/224 |
| 2019/0318872 A1 * | 10/2019 | Mizuno ................. | H01G 4/012 |
| 2020/0118756 A1 | 4/2020 | Lee et al. | |

(Continued)

FOREIGN PATENT DOCUMENTS

| | | | |
|---|---|---|---|
| JP | 10097942 A | * | 4/1998 |
| JP | 2015-076452 A | | 4/2015 |

(Continued)

OTHER PUBLICATIONS

Extended European Search Report dated Feb. 11, 2025, issued in corresponding European Patent Application No. 24165087.8.

*Primary Examiner* — Eric W Thomas

(74) *Attorney, Agent, or Firm* — Morgan, Lewis & Bockius LLP

(57) ABSTRACT

A multi-layered ceramic capacitor according to an embodiment includes: a body; a first external electrode disposed on an outer surface of the body and electrically connected to the first internal electrode; and a second external electrode disposed on an outer surface of the body and electrically connected to the second internal electrode; a first inclined portion in which a corner region of the first surface is chamfered and a second inclined portion in which a corner region of the second surface is chamfered.

20 Claims, 29 Drawing Sheets

(56)            References Cited

U.S. PATENT DOCUMENTS

| | | |
|---|---|---|
| 2021/0005387 A1 | 1/2021 | Kwon et al. |
| 2022/0139631 A1 | 5/2022 | Yoshida |
| 2022/0172900 A1 | 6/2022 | Shimada |

FOREIGN PATENT DOCUMENTS

| | | |
|---|---|---|
| JP | 2018-142728 A | 9/2018 |
| JP | 2022-085195 A | 6/2022 |
| KR | 10-2019-0116126 A | 10/2019 |
| KR | 10-2442833 B1 | 9/2022 |

* cited by examiner

XII-XII'

XVIII-XVIII'

XIX-XIX'

E

F

MULTI-LAYERED CERAMIC CAPACITOR INCLUDING BODY HAVING INCLINED PORTIONS

CROSS-REFERENCE TO RELATED APPLICATION

This application claims priority to and the benefit of Korean Patent Application No. 10-2023-0061902 filed in the Korean Intellectual Property Office on May 12, 2023, the entire contents of which are incorporated herein by reference.

BACKGROUND OF THE INVENTION

(a) Field of the Invention

The present disclosure relates to a multi-layered ceramic capacitor.

(b) Description of the Related Art

Use of an electronic device using a multi-layer ceramic capacitor (MLCC) has recently been rapidly increasing. A greater number of capacitors have been used in a smartphone in the 5th generation era, and such capacitors are required to have high capacity. However, a mounting area of a passive element such as the MLCC and an inductor has decreased as a size of a set product has been reduced, and accordingly, miniaturization and thinning of the passive element has further been required. Accordingly, there is a proposed method in which the MLCC and the inductor are packaged with an IC and an AP, are embedded in a substrate, or are mounted on a lower end portion of the AP in an LSC manner to improve a degree of mounting freedom.

In this case, not only a reduction in a mounting area but also a reduction in ESL generated within a substrate, may be achieved. Accordingly, there is increasing demand for an MLCC product having a low thickness.

However, in the case of a low profile capacitor having a significantly low thickness, such as an embedded capacitor, a surface-mount capacitor, or the like, there is a problem in which a corner portion of the low profile capacitor may be easily broken.

SUMMARY OF THE INVENTION

Embodiments are to provide a multi-layered ceramic capacitor that may prevent a phenomenon in which a corner portion thereof is broken while minimizing removal of an external electrode and may improve moisture resistance reliability.

However, problems to be solved by embodiments of the present disclosure are not limited to the above-described problem and may be variously extended in a range of technical ideas included in the present disclosure.

A multi-layered ceramic capacitor according to an embodiment includes: a body that includes dielectric layers stacked in a first direction and a first internal electrode and a second internal electrode interposed between the dielectric layers and includes a first surface and a second surface facing each other in the first direction, a third surface and a fourth surface facing each other in a second direction perpendicular to the first direction, and a fifth surface and a sixth surface facing each other in a third direction perpendicular to the first direction and the second direction; a first external electrode disposed on the third surface of the body and electrically connected to the first internal electrode; and a second external electrode disposed on the fourth surface of the body and electrically connected to the second internal electrode. The body includes a first inclined portion in which edge regions of the first surface are chamfered and a second inclined portion in which edge regions of the second surface are chamfered, a ratio of a first length of the first inclined portion along the second direction to a second length of the second inclined portion along the second direction is 0.67 to 1.5, a ratio of a third length of the first inclined portion along the first direction to a fourth length of the second inclined portion along the first direction is 0.4 to 2.5, a ratio of the third length to a fifth length from the first surface to the second surface along the first direction is 0.17 to 0.42, and a ratio of the fourth length to the fifth length is 0.17 to 0.42.

Each of the first external electrode and the second external electrode may include: an electrode layer; a first plating layer disposed on the electrode layer; and a second plating layer disposed on the first plating layer.

The first plating layer may include nickel.

The second plating layer may include copper or tin.

The first external electrode may be disposed on the third surface and may extend to the first surface and the second surface, and the second external electrode may be disposed on the fourth surface and may extend to the first surface and the second surface.

The first external electrode may be disposed on the third surface and may extend to the second surface, and the second external electrode may be disposed on the fourth surface and may extend to the second surface.

Each of the first external electrode and the second external electrode may include: an electrode layer disposed on the second surface; a first plating layer disposed on the electrode layer; and a second plating layer disposed on the first plating layer.

The electrode layer may include a third inclined portion in which a corner region is chamfered.

The third inclined portion may be connected to the second inclined portion.

The first inclined portion may be inclined toward a central portion of the body as the first inclined portion goes toward the outside of the body along the first direction.

The first inclined portion may extend along the third direction.

The first inclined portion may extend to surround an edge of the first surface.

The second inclined portion may be inclined toward a central portion of the body as the second inclined portion goes toward the outside of the body along the first direction.

The second inclined portion may extend along the third direction.

The second inclined portion may extend to surround an edge of the second surface.

A thickness along the first direction may be 100 μm or less.

A multi-layered ceramic capacitor according to another embodiment includes: a body that includes dielectric layers stacked in a first direction and a first internal electrode and a second internal electrode interposed between the dielectric layers and includes a first surface and a second surface facing each other in the first direction, a third surface and a fourth surface facing each other in a second direction perpendicular to the first direction, and a fifth surface and a sixth surface facing each other in a third direction perpendicular to the first direction and the second direction; a first external electrode that is disposed at the outside of the body and is electrically connected to the first internal electrode;

and a second external electrode that is electrically connected to the second internal electrode and is disposed to face the first external electrode in the second direction. The body includes a first inclined portion in which edge regions of the first surface are chamfered and a second inclined portion in which edge regions of the second surface are chamfered, a ratio of a first length of the first inclined portion along the third direction to a second length of the second inclined portion along the third direction is 0.67 to 1.5, a ratio of a third length of the first inclined portion along the first direction to a fourth length of the second inclined portion along the first direction is 0.4 to 2.5, a ratio of the third length to a fifth length from the first surface to the second surface along the first direction is 0.17 to 0.42, and a ratio of the fourth length to the fifth length is 0.17 to 0.42.

Each of the first external electrode and the second external electrode may include: an electrode layer; a first plating layer disposed on the electrode layer; and a second plating layer disposed on the first plating layer.

The first inclined portion and the second inclined portion may extend along the second direction.

The first inclined portion and the second inclined portion may be inclined toward a central portion of the body as the first inclined portion and the second inclined portion go toward the outside of the body along the first direction.

According to the multi-layered ceramic capacitor according to the embodiments, it is possible to prevent a phenomenon in which a corner portion of the multi-layered ceramic capacitor is broken while minimizing removal of an external electrode and to improve moisture resistance reliability.

BRIEF DESCRIPTION OF THE DRAWINGS

FIG. 1 is a perspective view schematically showing a multi-layered ceramic capacitor according to an embodiment of the present disclosure.

FIG. 2 and FIG. 3 are perspective views schematically showing a body of the multi-layered ceramic capacitor according to an embodiment.

FIG. 4 is a cross-sectional view taken along a line IV-IV' of FIG. 1.

FIG. 5 is a cross-sectional view taken along a line V-V' of FIG. 1.

FIG. 9 and FIG. 10 are perspective views schematically showing a body of the multi-layered ceramic capacitor according to the other embodiment.

FIG. 11 is a cross-sectional view taken along a line XI-XI' of FIG. 8.

FIG. 16 and FIG. 17 are perspective views schematically showing a body of the multi-layered ceramic capacitor according to the other embodiment.

FIG. 18 is a cross-sectional view taken along a line XVIII-XVIII' of FIG. 15.

DETAILED DESCRIPTION OF THE EMBODIMENTS

Figure 6:
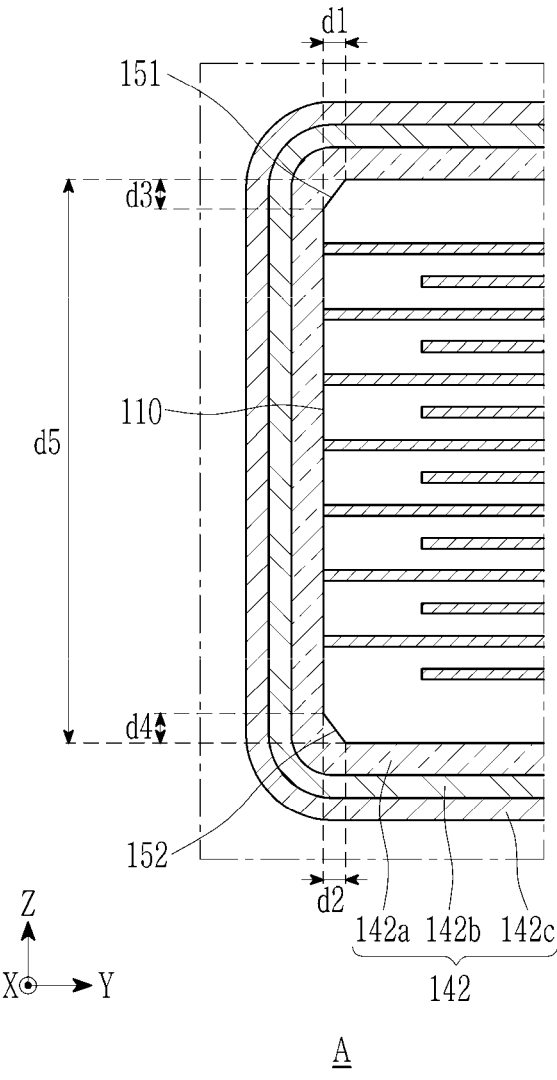
FIG. 6 is an enlarged cross-sectional view of a portion A of FIG. 4.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. In the drawings, size and thickness of each element are arbitrarily illustrated for convenience of description, and the present disclosure is not necessarily limited to as illustrated in the drawings.

In addition, the attached drawing is only for easy understanding of the embodiment disclosed in the present specification, and the technical idea disclosed in this specification is not limited by the attached drawing, and all changes included in the spirit and technical range of the present disclosure, should be understood to include equivalents or substitutes.

Terms including an ordinal number such as first, second, and the like may be used to describe various configurations elements, but the constituent elements are not limited by the terms. The terms are used only for the purpose of distinguishing one constituent element from another.

It will be understood that when an element such as a layer, film, region, or substrate is referred to as being "on" or "above" another element, it may be directly on the other element or intervening elements may also be present. In contrast, when an element is referred to as being "directly on" another element, there are no intervening elements present. Further, throughout the specification, the word "on" or "above" a target element will be understood to be disposed above or below the target element, and will not necessarily be understood to be disposed "at an upper side" based on an opposite to gravity direction.

In the present application, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by perpendicularly cutting a target portion from the side.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

In the drawings, a Z direction may be defined as a first direction or a thickness direction, a Y direction may be defined as a second direction or a width direction, and an X direction may be defined as a third direction or a length direction. Here, the Z direction (the thickness direction) may be used as the same concept as a stacking direction in which dielectric layers 111, 211, 311, 411, and 511 are stacked.

Figure 1:
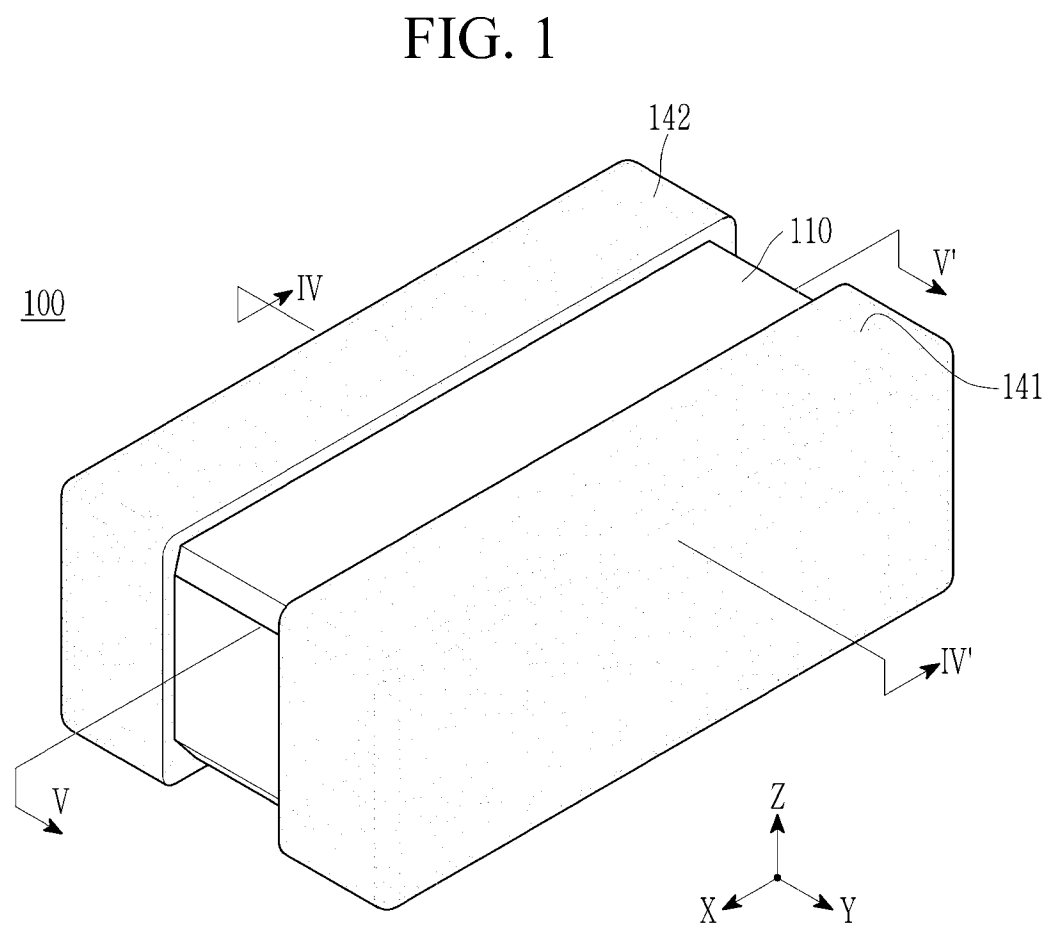

Hereinafter, with reference to FIGS. 1 to 7, a multi-layered ceramic capacitor 100 according to an embodiment of the present disclosure is described in detail.

Figure 2:
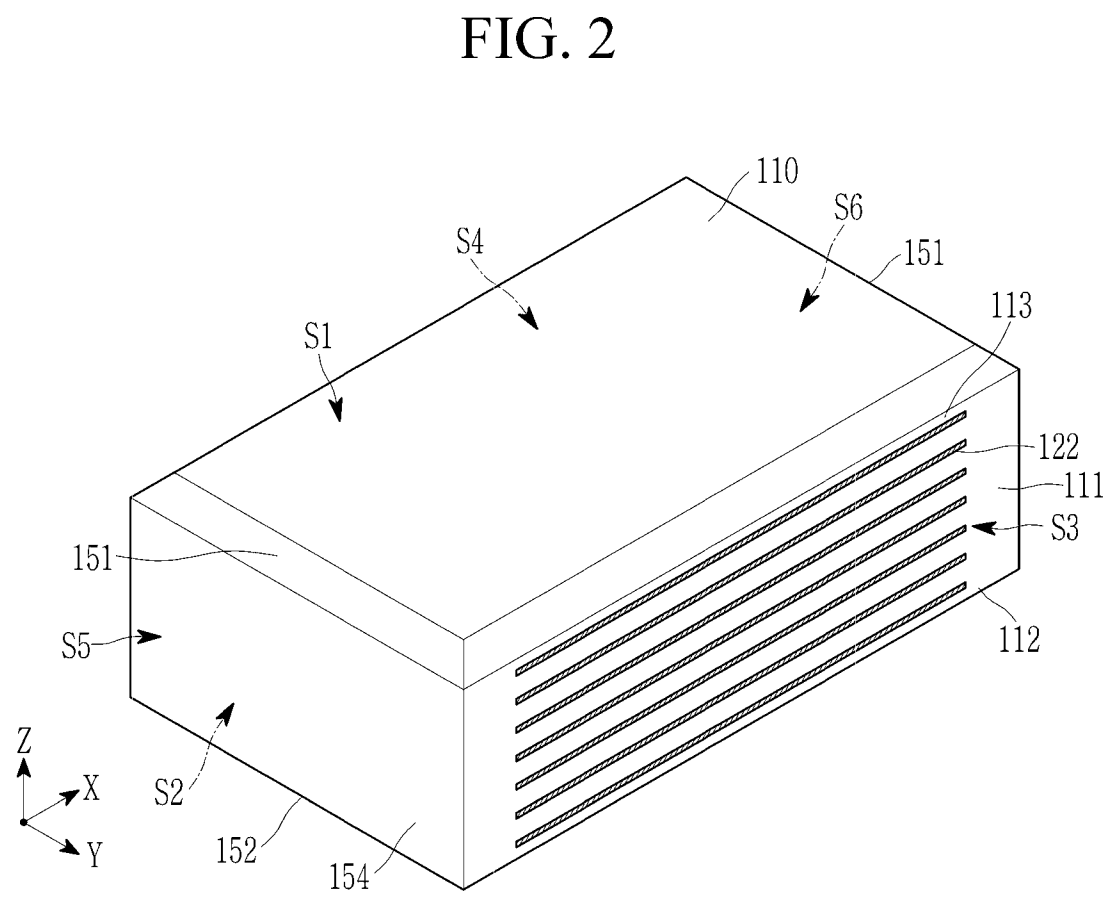
Figure 3:
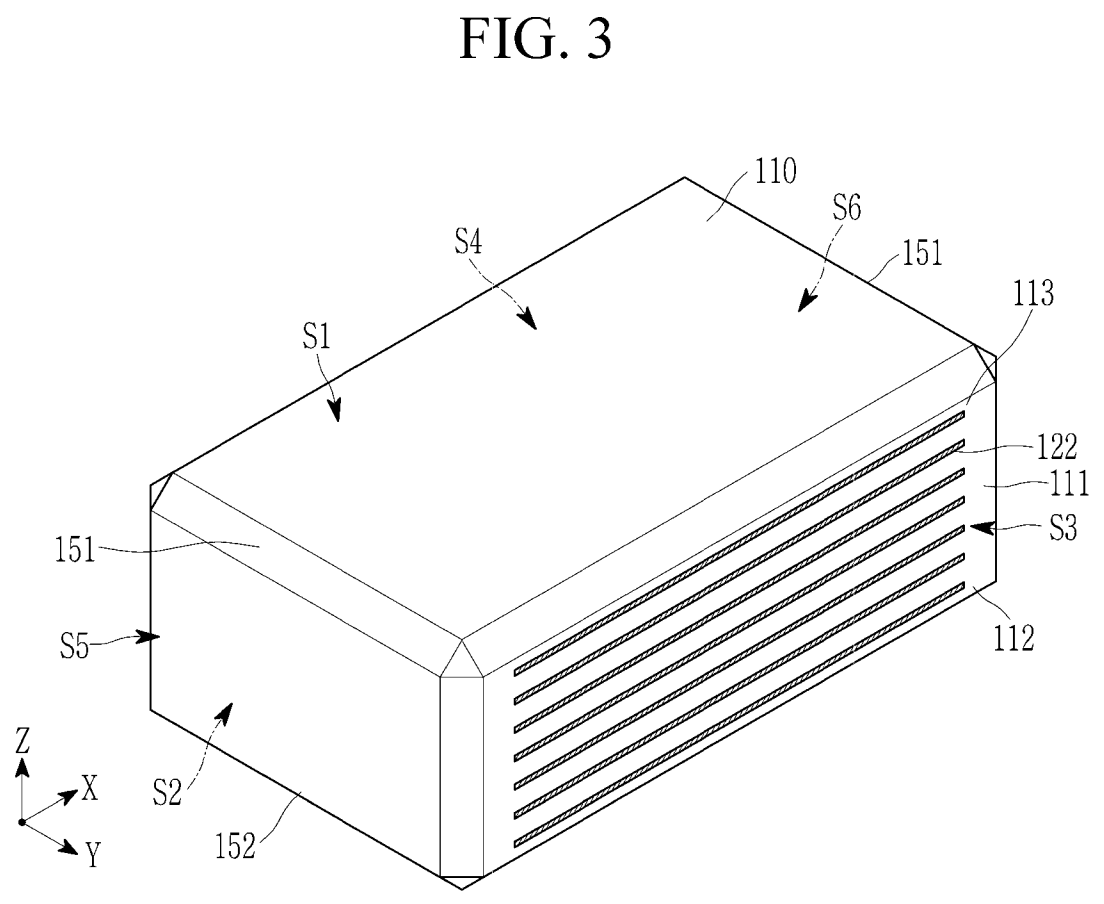

FIG. 1 is a perspective view schematically showing the multi-layered ceramic capacitor according to the embodiment of the present disclosure, and FIG. 2 and FIG. 3 are perspective views schematically showing a body of the multi-layered ceramic capacitor according to an embodiment.

The multi-layered ceramic capacitor 100 according to the embodiment of the present disclosure may include a body 110 that includes dielectric layers 111 stacked in the Z direction (the thickness direction) and first and second internal electrodes 121 and 122 interposed between the dielectric layers 111 and includes first and second surfaces S1 and S2 facing each other in the Z direction (the thickness direction), third and fourth surfaces S3 and S4 facing each other in the Y direction (the width direction) perpendicular to the Z direction (the thickness direction), and fifth and sixth surfaces S5 and S6 facing each other in the X direction (the length direction) perpendicular to the Z direction (the thickness direction) and the Y direction (the width direction), a first external electrode 141 disposed at the outside of the body 110 and electrically connected to the first internal electrode 121, and a second external electrode 142 electrically connected to the second internal electrode 122 and disposed to face the first external electrode 141 in the Y direction (the width direction). The body 110 may include a first inclined portion 151 in which four edge regions of the first surface S1 are chamfered and a second inclined portion 152 in which four edge regions of the second surface S2 are chamfered.

The multi-layered ceramic capacitor 100 according to the present embodiment may have a thickness of 100 μm or less. A thickness of the multi-layered ceramic capacitor 100 may be a value obtained by measuring a maximum straight line distance from a point on an upper surface (the first surface S1) of the multi-layered ceramic capacitor 100 to a lower surface (the second surface S2) of the multi-layered ceramic capacitor 100 along the Z direction (the thickness direction).

The body 110 may include the dielectric layers 111 and the internal electrodes 121 and 122 alternately stacked. There is no particular limitation on a specific shape of the body 110, but as shown in the drawings, the body 110 may have a hexahedral shape or a shape similar to the hexahedral shape. Due to shrinkage of ceramic powder included in the body 110 during a firing process, the body 110 does not have a hexahedral shape with a completely straight line, but may have a substantially hexahedral shape. For example, the body 110 may have a thickness along the Z direction with a predetermined size, a length along the X direction, and a width along the Y direction, and may have the substantially hexahedral shape with the thickness less than the width.

The body 110 may have the first and second surfaces S1 and S2 facing each other in the Z direction (the thickness direction), the third and fourth surfaces S3 and S4 connected to the first and second surfaces S1 and S2 and facing each other in the Y direction (the width direction), and the fifth and sixth surfaces S5 and S6 connected to the first and second surfaces S1 and S2 and the third and fourth surfaces S3 and S4 and facing each other in the X direction (the length direction). In this case, one surface selected from among the first, second, third, and fourth surfaces S1, S2, S3, and S4 may be a mounting surface. Referring to FIG. 2, the body 110 may include the inclined portions 151 at a portion of edge regions where two surfaces are connected, for example, at least one of the corners regions where: the first surface and the third surface are met; the first and the fourth surface are met; the first surface and the fifth surface are met; and the first surface and the sixth surface are met. In some embodiments, the body 110 may include the incline portions 152 at a portion of edge regions where two surface are connected, for example, at least one of the corners regions where: the second surface and the third surface are met; the second and the fourth surface are met; the second surface and the fifth surface are met; and the second surface and the sixth surface are met. In addition, referring to FIG. 3, the inclined portion 151 may include four corner regions where three surfaces are connected, for example, at least one of the corner regions where: the first, third and fifth surfaces are met; the first, fourth and fifth surfaces are met; the first, fourth and sixth surfaces are met; and the first, third and sixth surfaces are met. In some embodiments, the inclined portion 152 may include four corner regions where three surfaces are connected, for example, at least one of the corner regions where: the second, third and fifth surfaces are met; the second, fourth and fifth surfaces are met; the second, fourth and sixth surfaces are met; and the second, third and sixth surfaces are met.

Lengths of the third surface S3 and the fourth surface S4 of the body 110 along the X direction (the length direction) may be greater than widths of the fifth surface S5 and the sixth surface S6 of the body 110 along the Y direction (the width direction).

The body 110 may be formed by stacking a plurality of dielectric layers 111 in the Z direction (the thickness direction) and then firing the stacked dielectric layers, and a boundary between adjacent dielectric layers 111 may be integrated to an extent that it is difficult to check without using a scanning electron microscope (SEM).

A raw material forming the dielectric layer 111 is not particularly limited as long as the raw material may obtain sufficient capacitance. For example, a barium titanate-based material, a lead composite perovskite-based material, a strontium titanate-based material, or the like may be used. The barium titanate-based material may include $BaTiO_3$-based ceramic powder. An example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), $Ba(Ti_{1-y}Zr_y)O_3$ (0<y<1), or the like in which Ca (calcium), Zr (zirconium), or the like is partially dissolved in $BaTiO_3$. A material forming the dielectric layer 111 may include a material in which various ceramic additives, organic solvents, plasticizers, binders, dispersants, and the like are added to a powder such as barium titanate ($BaTiO_3$) or the like depending on a purpose of the present disclosure.

First and second cover portions 112 and 113 of predetermined thicknesses may be formed at a lower portion of a lowermost internal electrode and an upper portion of an uppermost internal electrode of the body 110. In this case, the first and second cover portions 112 and 113 may be made of the same composition as the dielectric layer 111, and may be formed by respectively stacking at least one dielectric layer that does not include the internal electrode at the upper portion of the uppermost internal electrode and the lower portion of the lowermost internal electrode of the body 110.

As an example of the present disclosure, an identification portion (not shown) may be disposed above or on the first cover portion 112 or the second cover portion 113 if necessary. The identification portion may be formed at either the first cover portion 112 or the second cover portion 113, and may function to identify upper and lower portions of the body 110 by a difference in brightness or color. The identification portion may be a dielectric layer in which one ceramic green sheet is fired or a plurality of ceramic green sheets are stacked, and may be included within the first cover portion 112 or the second cover portion 113.

A method of making the identification portion have the difference in brightness or color from the first or second cover portions 112 and 113 is not particularly limited. The identification portion may be formed using a ceramic particle that is different in size from a ceramic particle included in the body, or may be formed by adding a component such as an oxide of one or more metals selected from Ni, Mn, Cr, Mg, Y, and V, $BaSiO_3$, $CaSiO_3$, or the like to a ceramic component. The identification portion may be formed using a laser marking method or the like, but the present disclosure is not limited thereto.

A thickness of the body 110 may be 100 μm or less. The thickness of the body 110 may be an average vertical distance between the first surface S1 and the second surface S2, and a lower limit of the thickness of the body 110 is not particularly limited, but may be, for example, 5 μm or more. By manufacturing the body 110 having a thickness of 100 μm or less, the multi-layered ceramic capacitor according to the present disclosure may be applied to a multi-layered ceramic capacitor for embedding a substrate and/or a capacitor that may be mounted as a land side capacitor (LSC) type at a lower end portion of an AP.

The internal electrodes 121 and 122 may include the first and second internal electrodes 121 and 122 that are alternately disposed to face each other with the dielectric layer 111 therebetween.

Each of the first and second internal electrodes 121 and 122 may include the largest amount of nickel (Ni), but the present disclosure is not limited thereto. For example, the first and second internal electrodes 121 and 122 may be formed using a conductive paste including one or more materials of silver (Ag), palladium (Pd), gold (Au), platinum (Pt), nickel (Ni), tin (Sn), copper (Cu), tungsten (W), titanium (Ti), or alloys thereof. A printing method of the conductive paste may be a screen printing method, a gravure printing method, or the like, but the present disclosure is not limited thereto.

According to the present embodiment, the first and second external electrodes 141 and 142 may be respectively disposed at the third and fourth surfaces S3 and S4 of the body 110 facing each other in the Y direction (the width direction). The first external electrode 141 may be disposed at the third surface S3, and may extend to the first and second surfaces S1 and S2. The second external electrode 142 may be disposed at the fourth surface S4, and may extend to the first and second surfaces S1 and S2.

Hereinafter, with reference to FIGS. 4 and 5, a structure of the external electrode will be described based on the first external electrode 141, but this may be equally applied to the second external electrode 142.

Figure 4:
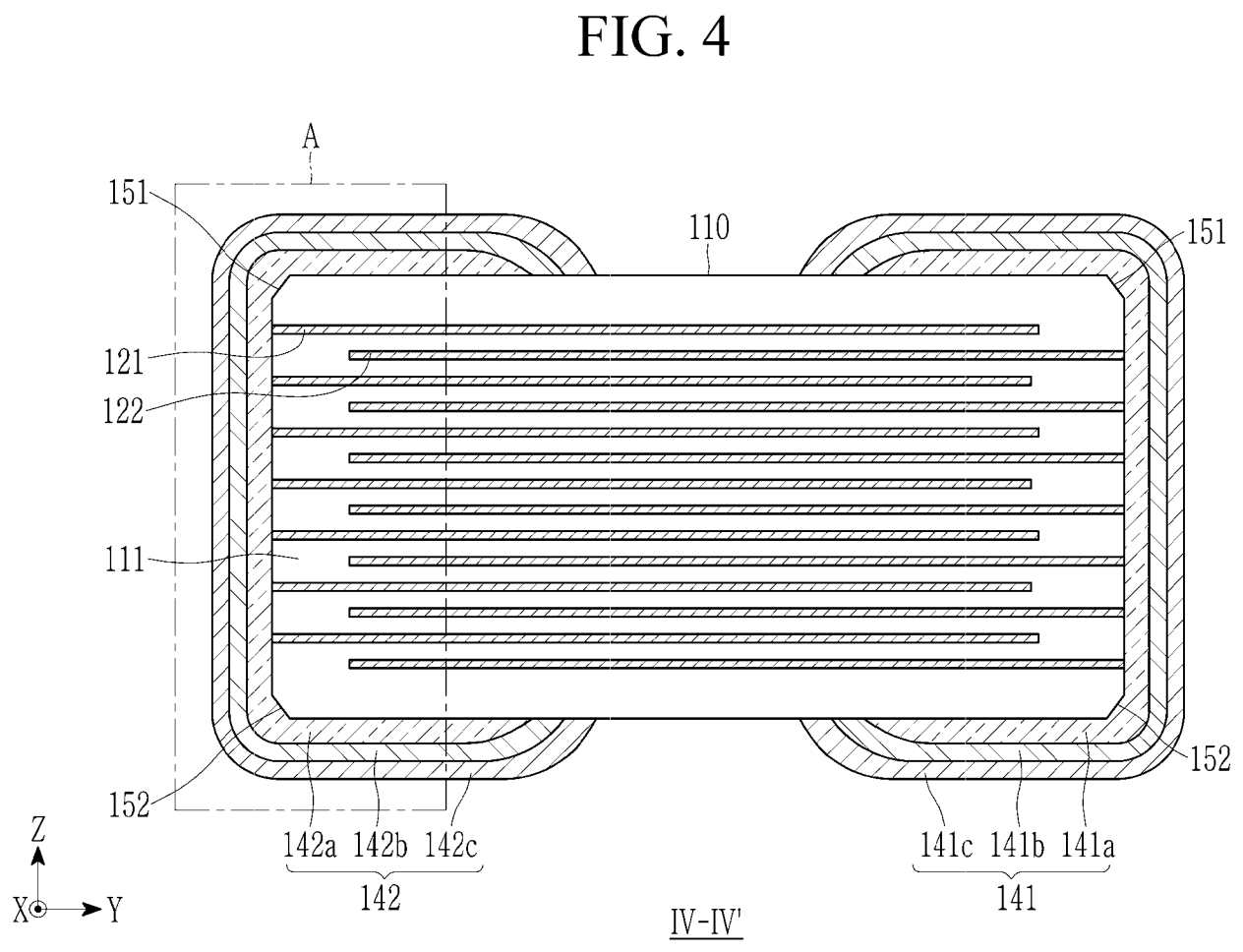
Figure 5:
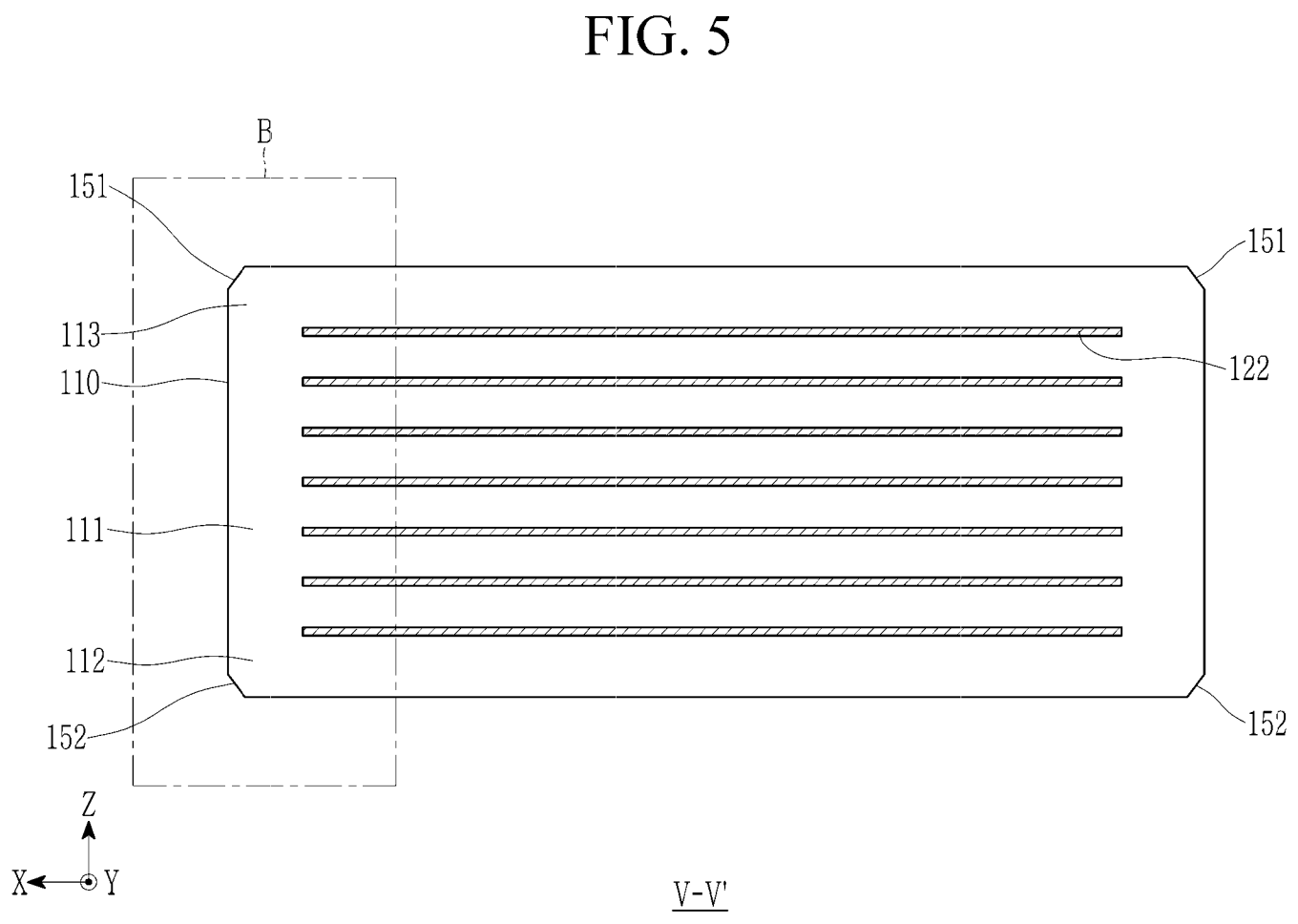

FIG. 4 is a cross-sectional view taken along a line IV-IV' of FIG. 1, and FIG. 5 is a cross-sectional view taken along a line V-V' of FIG. 1.

Referring to FIG. 4 and FIG. 5, the first external electrode 141 may include an electrode layer 141a, a first plating layer 141b disposed on the electrode layer 141a, and a second plating layer 141c disposed on the first plating layer 141b. The electrode layer 141a may include one or more materials selected from the group consisting of silver (Ag), palladium (Pd), gold (Au), platinum (Pt), nickel (Ni), copper (Cu), tin (Sn), tungsten (W), titanium (Ti), and alloys thereof. For example, the electrode layer 141a may include a fired electrode formed by firing a conductive paste including nickel (Ni). When the external electrode is formed as the fired electrode like the electrode layer 141a, the body and the internal electrode may be simultaneously fired, and a fixing strength between the body and the external electrode may be further improved.

The first plating layer 141b according to the present embodiment may be a plating layer including nickel, and the second plating layer 141c may be a plating layer including copper or tin. The first plating layer 141b may include nickel so that it improves adhesion between the first plating layer 141b and the electrode layer 141a. Additionally, because the second plating layer 141c includes copper or tin, the external electrode with excellent conductivity, plating adhesion, and solderability may be formed.

Hereinafter, the first inclined portion 151 and the second inclined portion 152 will be described with reference to FIGS. 4 to 7.

Referring to FIG. 4 and FIG. 5, the body 110 may include the first inclined portion 151 in which upper surface (the first surface) edge regions are chamfered. The body 110 may include the first inclined portion 151 in which a corner region of the first surface S1 is chamfered. The first inclined portion 151 may be formed on the first surface S1 of the body 110 and a surface connected to the first surface S1. For example, the first inclined portion 151 may be formed at edge regions connecting the first and third surfaces S1 and S3, the first and fourth surfaces S1 and S4, the first and fifth surfaces S1 and S5, and the first and sixth surfaces S1 and S6 of the body 110. The first inclined portion 151 may extend along the X direction (the length direction) and the Y direction (the width direction). For example, the first inclined portion 151 may extend to surround an edge of the first surface S1 of the body 110. The first inclined portion 151 may have a shape inclined toward a central portion of the body 110 as it goes toward the outside of the body 110 along the Z direction (the thickness direction).

Additionally, the body 110 may include the second inclined portion 152 in which a lower surface (the second surface) corner region is chamfered. The body 110 may include the second inclined portion 152 in which an edge region of the second surface S2 is chamfered. The second inclined portion 152 may be formed on the second surface S2 of the body 110 and a surface connected to the second surface S2. For example, the second inclined portion 152 may be formed at edge regions connecting the second and third surfaces S2 and S3, the second and fourth surfaces S2 and S4, the second and fifth surfaces S2 and S5, and the second and sixth surfaces S2 and S6 of the body 110. The second inclined portion 152 may extend along the X direction (the length direction) and the Y direction (the width direction). For example, the second inclined portion 152 may extend to surround an edge of the second surface S2 of the body 110. The second inclined portion 152 may have a shape inclined toward the central portion of the body 110 as it goes toward the outside of the body 110 along the Z direction (the thickness direction).

Figure 7:
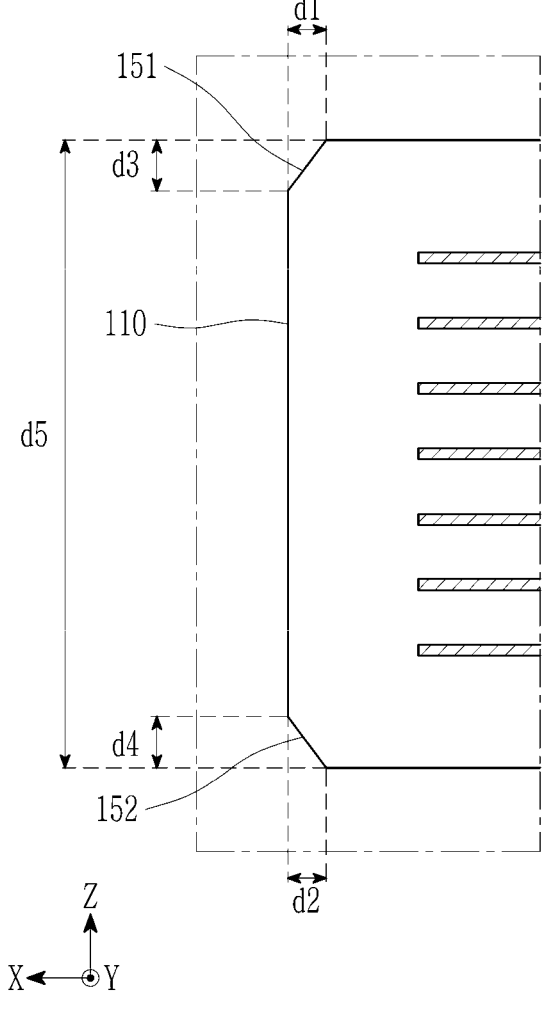
FIG. 7 is an enlarged cross-sectional view of a portion B of FIG. 5.

FIG. 6 is an enlarged cross-sectional view of a portion A of FIG. 4, and FIG. 7 is an enlarged cross-sectional view of a portion B of FIG. 5.

Hereinafter, first to fifth lengths d1, d2, d3, d4, and d5 may be measured by observing using an optical microscope, a scanning electron microscope, or the like.

Referring to FIG. 6 and FIG. 7, a ratio of the first length d1 of the first inclined portion 151 to the second length d2 of the second inclined portion 152 may be about 0.67 to about 1.5.

Referring to FIG. 6, the first length d1 may be a value measured along the Y direction (the width direction) from a point where a straight line passing through a center of the Z direction (the thickness direction) of an outer surface of the Y direction (the width direction) of the body 110 and the first inclined portion 151 meet, to a point where a straight line passing through a center of the Y direction (the width direction) of an outer surface of the Z direction (the thickness direction) of the body 110 and the first inclined portion 151 meet in a Y-Z direction cross-section passing through a center point of the X direction (the length direction) of the multi-layered ceramic capacitor 100. In addition, the second length d2 may be a value measured along the Y direction (the width direction) from a point where the straight line passing through the center of the Z direction (the thickness direction) of the outer surface of the Y direction (the width direction) of the body 110 and the second inclined portion 152 meet to a point where the straight line passing through the center of the Y direction (the width direction) of the outer surface of the Z direction (the thickness direction) of the body 110 and the second inclined portion 152 meet in the Y-Z direction cross-section passing through the center point of the X direction (the length direction) of the multi-layered ceramic capacitor 100.

In addition, referring to FIG. 7, the first length d1 may be a value measured along the X direction (the length direction) from a point where a straight line passing through a center of the Z direction (the thickness direction) of an outer surface of the X direction (the length direction) of the body 110 and the first inclined portion 151 meet to a point where a straight line passing through a center of the X direction (the length direction) of an outer surface of the Z direction (the thickness direction) of the body 110 and the first inclined portion 151 meet in an X-Z direction cross-section passing through a center point of the Y direction (the width direction) of the multi-layered ceramic capacitor 100. In addition, the second length d2 may be a value measured along the X direction (the length direction) from a point where the straight line passing through the center of the Z direction (the thickness direction) of the outer surface of the X direction (the length direction) of the body 110 and the second inclined portion 152 meet to a point where the straight line passing through the center of the X direction (the length direction) of the outer surface of the Z direction (the thickness direction) of the body 110 and the second inclined portion 152 meet in the X-Z direction cross-section passing through the center point of the Y direction (the width direction) of the multi-layered ceramic capacitor 100.

A ratio of the third length d3 of the first inclined portion 151 to the fourth length d4 of the second inclined portion 152 may be about 0.4 to about 2.5.

Referring to FIG. 6, the third length d3 may be a value measured along the Z direction (the thickness direction)

from the point where the straight line passing through the center of the Y direction (the width direction) of the outer surface of the Z direction (the thickness direction) of the body 110 and the first inclined portion 151 meet to the point where the straight line passing through the center of the Z direction (the thickness direction) of the outer surface of the Y direction (the width direction) of the body 110 and the first inclined portion 151 meet in the Y-Z direction cross-section passing through the center point of the X direction (the length direction) of the multi-layered ceramic capacitor 100. In addition, the fourth length d4 may be a value measured along the Z direction (the thickness direction) from the point where the straight line passing through the center of the Y direction (the width direction) of the outer surface of the Z direction (the thickness direction) of the body 110 and the second inclined portion 152 meet to the point where the straight line passing through the center of the Z direction (the thickness direction) of the outer surface of the Y direction (the width direction) of the body 110 and the second inclined portion 152 meet in the Y-Z direction cross-section passing through the center point of the X direction (the length direction) of the multi-layered ceramic capacitor 100.

In addition, referring to FIG. 7, the third length d3 may be a value measured along the Z direction (the thickness direction) from the point where the straight line passing through the center of the X direction (the length direction) of the outer surface of the Z direction (the thickness direction) of the body 110 and the first inclined portion 151 meet to the point where the straight line passing through the center of the Z direction (the thickness direction) of the outer surface of the X direction (the length direction) of the body 110 and the first inclined portion 151 meet in the X-Z direction cross-section passing through the center point of the Y direction (the width direction) of the multi-layered ceramic capacitor 100. In addition, the fourth length d4 may be a value measured along the Z direction (the thickness direction) from the point where the straight line passing through the center of the X direction (the length direction) of the outer surface of the Z direction (the thickness direction) of the body 110 and the second inclined portion 152 meet to the point where the straight line passing through the center of the Z direction (the thickness direction) of the outer surface of the X direction (the length direction) of the body 110 and the second inclined portion 152 meet in the X-Z direction cross-section passing through the center point of the Y direction (the width direction) of the multi-layered ceramic capacitor 100.

Additionally, a ratio of the third length d3 to the fifth length d5 from an upper surface to a lower surface of the body 110 along the Z direction (the thickness direction) may be about 0.17 to about 0.42. In addition, a ratio of the fourth length d4 to the fifth length d5 may be about 0.17 to about 0.42.

Referring to FIG. 6, the fifth length d5 may be a value measured along the Z direction (the thickness direction) from the point where the straight line passing through the center of the Y direction (the width direction) of the outer surface of the Z direction (the thickness direction) of the body 110 and the first inclined portion 151 meet to the point where the straight line passing through the center of the Y direction (the width direction) of the outer surface of the Z direction (the thickness direction) of the body 110 and the second inclined portion 152 meet in the Y-Z direction cross-section passing through the center point of the X direction (the length direction) of the multi-layered ceramic capacitor 100.

In addition, referring to FIG. 7, the fifth length d5 may be a value measured along the Z direction (the thickness direction) from the point where the straight line passing through the center of the X direction (the length direction) of the outer surface of the Z direction (the thickness direction) of the body 110 and the first inclined portion 151 meet to a point where the straight line passing through the center of the X direction (the length direction) of the outer surface of the Z direction (the thickness direction) of the body 110 and the second inclined portion 151 meet in the X-Z direction cross-section passing through the center point of the Y direction (the width direction) of the multi-layered ceramic capacitor 100.

The fifth length d5 may be a length along the Z direction (the thickness direction) from the first surface S1 to the second surface S2.

TABLE 1

| d1 | d2 | d3 | d4 | d5 | $\frac{d1}{d2}$ | $\frac{d3}{d4}$ | $\frac{d3}{d5}$ | $\frac{d4}{d5}$ | Prevention of chipping |
|----|----|----|----|----|------|------|-------|-------|------------------------|
| 5  | 5  | 15 | 15 | 60 | 1.0 | 1.0 | 0.250 | 0.250 | OK |
| 5  | 5  | 15 | 20 | 60 | 1.0 | 0.8 | 0.250 | 0.333 | OK |
| 5  | 5  | 15 | 25 | 60 | 1.0 | 0.6 | 0.250 | 0.417 | OK |
| 5  | 5  | 20 | 25 | 60 | 1.0 | 0.8 | 0.333 | 0.417 | OK |
| 5  | 10 | 15 | 15 | 60 | 0.5 | 1.0 | 0.250 | 0.250 | OK |
| 5  | 10 | 15 | 20 | 60 | 0.5 | 0.8 | 0.250 | 0.333 | OK |
| 5  | 10 | 15 | 25 | 60 | 0.5 | 0.6 | 0.250 | 0.417 | OK |
| 5  | 10 | 20 | 25 | 60 | 0.5 | 0.8 | 0.333 | 0.417 | NG |
| 5  | 15 | 15 | 15 | 60 | 0.3 | 1.0 | 0.250 | 0.250 | OK |
| 5  | 15 | 15 | 20 | 60 | 0.3 | 0.8 | 0.250 | 0.333 | OK |
| 5  | 15 | 15 | 25 | 60 | 0.3 | 0.6 | 0.250 | 0.417 | OK |
| 5  | 15 | 20 | 25 | 60 | 0.3 | 0.8 | 0.333 | 0.417 | NG |
| 10 | 10 | 15 | 15 | 60 | 1.0 | 1.0 | 0.250 | 0.250 | OK |
| 10 | 10 | 15 | 20 | 60 | 1.0 | 0.8 | 0.250 | 0.333 | OK |
| 10 | 10 | 15 | 25 | 60 | 1.0 | 0.6 | 0.250 | 0.417 | OK |
| 10 | 10 | 20 | 25 | 60 | 1.0 | 0.8 | 0.333 | 0.417 | NG |
| 10 | 10 | 20 | 20 | 60 | 1.0 | 1.0 | 0.333 | 0.333 | OK |
| 10 | 10 | 25 | 15 | 60 | 1.0 | 1.7 | 0.417 | 0.250 | OK |
| 10 | 15 | 20 | 20 | 60 | 0.7 | 1.0 | 0.333 | 0.333 | OK |
| 10 | 15 | 20 | 25 | 60 | 0.7 | 0.8 | 0.333 | 0.417 | NG |
| 10 | 15 | 25 | 15 | 60 | 0.7 | 1.7 | 0.417 | 0.250 | OK |
| 10 | 15 | 25 | 20 | 60 | 0.7 | 1.3 | 0.417 | 0.333 | NG |
| 15 | 15 | 15 | 15 | 60 | 1.0 | 1.0 | 0.250 | 0.250 | NG |
| 15 | 15 | 15 | 20 | 60 | 1.0 | 0.8 | 0.250 | 0.333 | NG |
| 15 | 15 | 15 | 25 | 60 | 1.0 | 0.6 | 0.250 | 0.417 | NG |
| 15 | 15 | 20 | 20 | 60 | 1.0 | 1.0 | 0.333 | 0.333 | NG |
| 15 | 15 | 20 | 25 | 60 | 1.0 | 0.8 | 0.333 | 0.417 | NG |

According to the multi-layered ceramic capacitor 100 including the first inclined portion 151 and the second inclined portion 152 that satisfies the above-described ratio of Table 1, a phenomenon in which a corner portion of the multi-layered ceramic capacitor is broken may be prevented, and moisture resistance reliability may be improved. If a ratio of the first length d1 to the second length d2 is less than 0.67 or greater than 1.5, poor appearance and poor moisture resistance reliability may occur. Likewise, if a ratio of the third length d3 to the fourth length d4 is less than 0.4 or greater than 2.5, poor appearance and poor moisture resistance reliability may occur. Additionally, if a ratio of the third length d3 to the fifth length d5 or a ratio of the fourth length d4 to the fifth length d5 is less than 0.17 or greater than 0.42, it may be difficult to prevent the phenomenon in which the corner portion of the multi-layered ceramic capacitor is broken, and poor appearance and poor moisture resistance reliability may occur.

Hereinafter, with reference to FIGS. 8 to 14, a multi-layered ceramic capacitor 200 according to another embodiment of the present disclosure will be described in detail.

Figure 8:
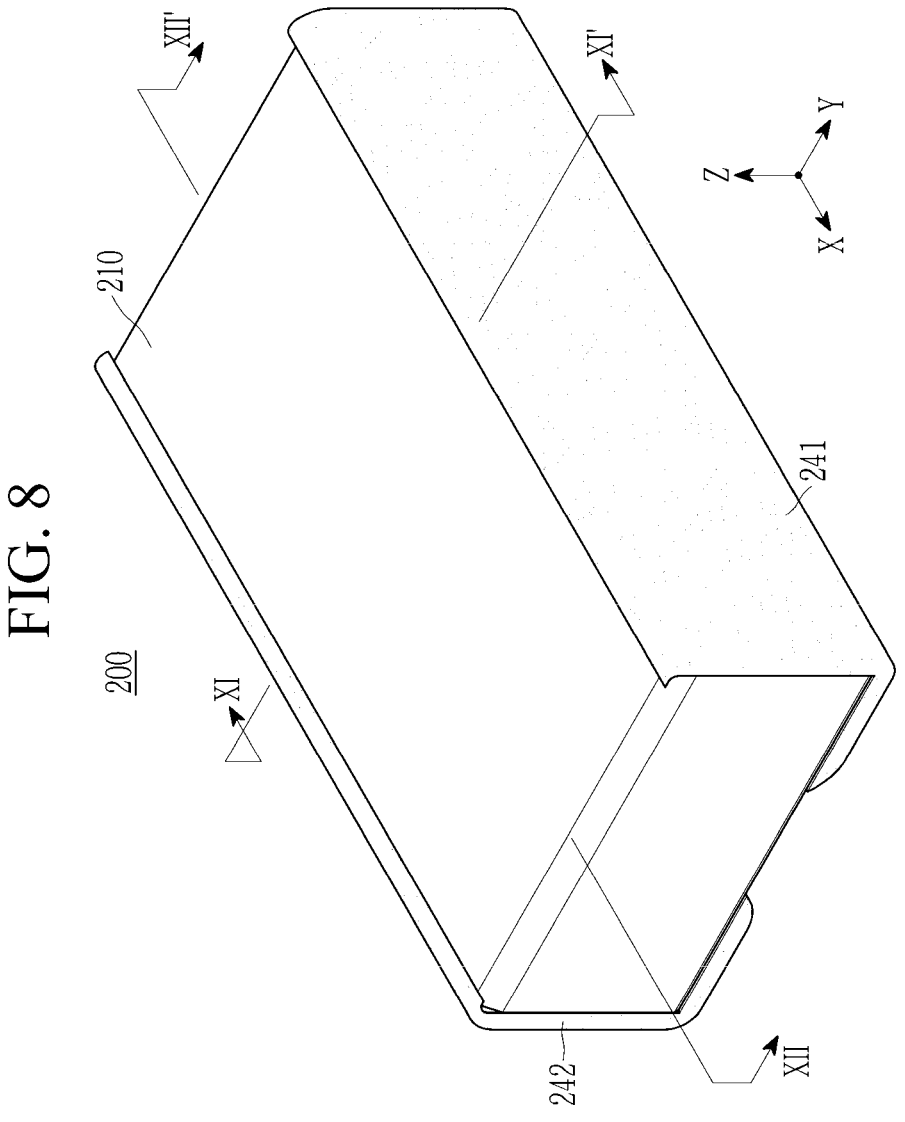
FIG. 8 is a perspective view schematically showing a multi-layered ceramic capacitor according to another embodiment of the present disclosure.
Figure 9:
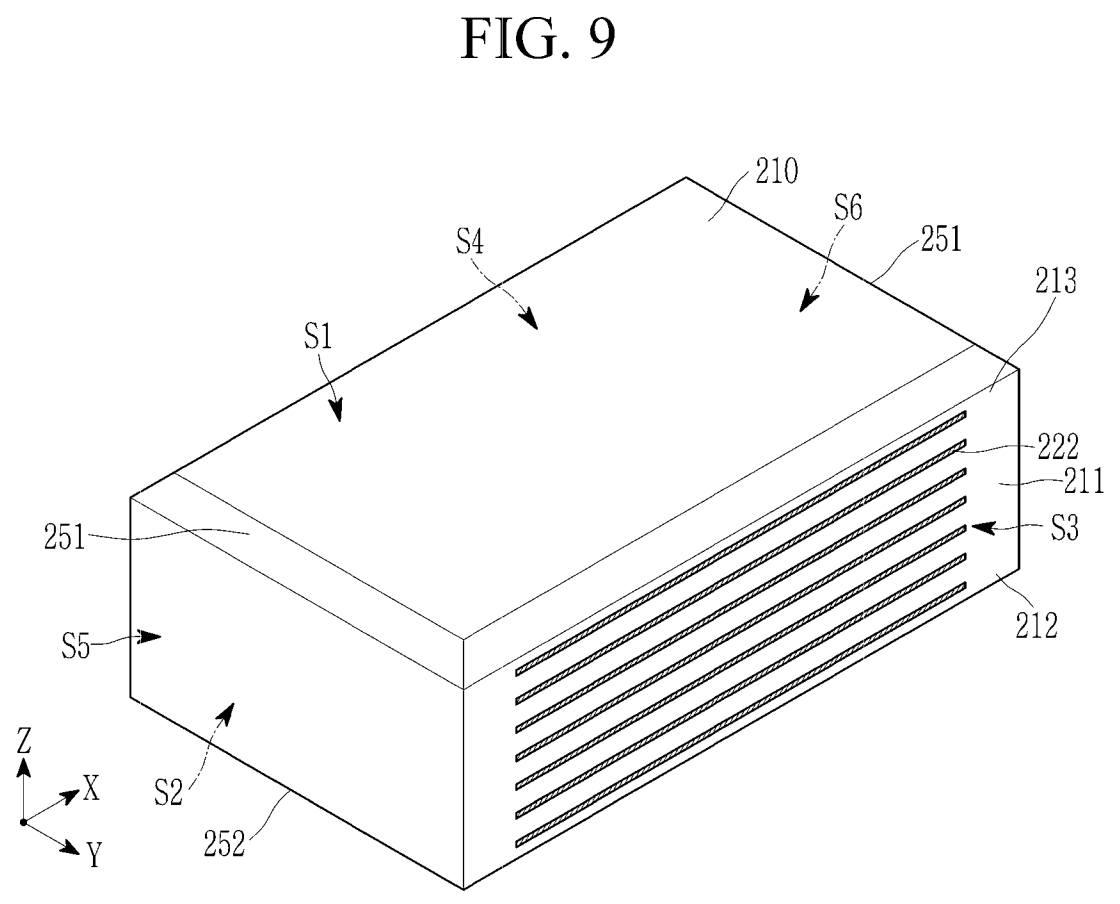
Figure 10:
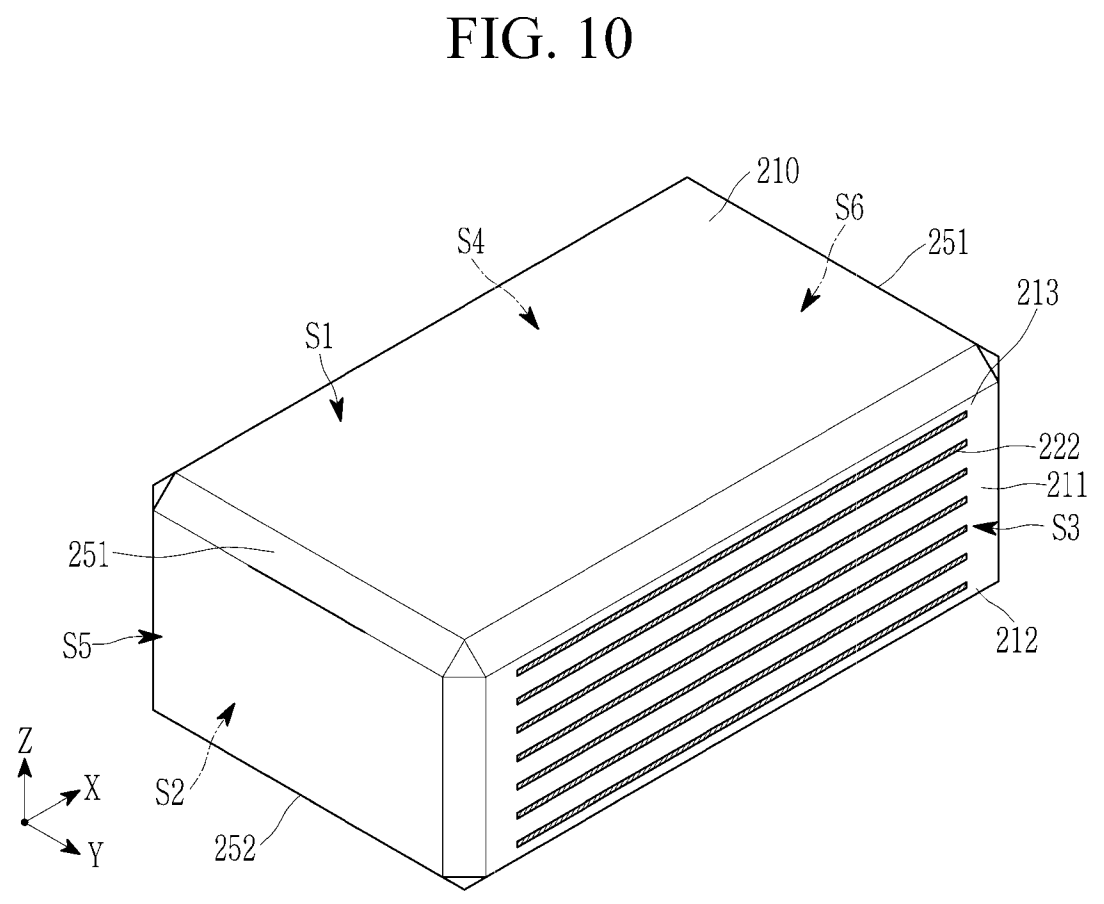

FIG. 8 is a perspective view schematically showing the multi-layered ceramic capacitor according to the other embodiment of the present disclosure, and FIG. 9 and FIG. 10 are perspective views schematically showing a body of the multi-layered ceramic capacitor according to the other embodiment.

The multi-layered ceramic capacitor 200 according to the other embodiment of the present disclosure may include a body 210 that includes dielectric layers 211 stacked in the Z direction (the thickness direction) and first and second internal electrodes 221 and 222 interposed between the dielectric layers 211 and includes first and second surfaces S1 and S2 facing each other in the Z direction (the thickness direction), third and fourth surfaces S3 and S4 facing each other in the Y direction (the width direction) perpendicular to the Z direction (the thickness direction), and fifth and sixth surfaces S5 and S6 facing each other in the X direction (the length direction) perpendicular to the Z direction (the thickness direction) and the Y direction (the width direction), a first external electrode 241 disposed at the outside of the body 210 and electrically connected to the first internal electrode 221, and a second external electrode 242 electrically connected to the second internal electrode 222 and disposed to face the first external electrode 241 in the Y direction (the width direction). The body 210 may include a first inclined portion 251 in which a corner region of the first surface S1 is chamfered and a second inclined portion 252 in which a corner region of the second surface S2 is chamfered.

The multi-layered ceramic capacitor 200 according to the present embodiment may have a thickness of 100 μm or less. A thickness of the multi-layered ceramic capacitor 200 may be a value obtained by measuring a maximum straight line distance from a point on an upper surface of the multi-layered ceramic capacitor 200 to a lower surface of the multi-layered ceramic capacitor 200 along the Z direction (the thickness direction).

The body 210 may include the dielectric layers 211 and the internal electrodes 221 and 222 alternately stacked. There is no particular limitation on a specific shape of the body 210, but as shown in the drawings, the body 210 may have a hexahedral shape or a shape similar to the hexahedral shape. Due to shrinkage of ceramic powder included in the body 210 during a firing process, the body 210 does not have a hexahedral shape with a completely straight line, but may have a substantially hexahedral shape. For example, the body 210 may have a thickness along the Z direction with a predetermined size, a length along the X direction, and a width along the Y direction, and may have the substantially hexahedral shape with the thickness less than the width.

The body 210 may have the first and second surfaces S1 and S2 facing each other in the Z direction (the thickness direction), the third and fourth surfaces S3 and S4 connected to the first and second surfaces S1 and S2 and facing each other in the Y direction (the width direction), and the fifth and sixth surfaces S5 and S6 connected to the first and second surfaces S1 and S2 and the third and fourth surfaces S3 and S4 and facing each other in the X direction (the length direction). In this case, one surface selected from among the first, second, third, and fourth surfaces S1, S2, S3, and S4 may be a mounting surface. Referring to FIG. 9, the body 210 may include the inclined portions 251 and 252 at a portion of edge regions where both surfaces are connected. In addition, referring to FIG. 10, the body 210 may include the inclined portion at the corner regions where three surfaces are connected.

Lengths of the third surface S3 and the fourth surface S4 of the body 210 along the X direction (the length direction) may be longer than widths of the fifth surface S5 and the sixth surface S6 of the body 210 along the Y direction (the width direction).

The body 210 may be formed by stacking a plurality of dielectric layers 211 in the Z direction (the thickness direction) and then firing the stacked dielectric layers, and a boundary between adjacent dielectric layers 211 may be integrated to an extent that it is difficult to check without using a scanning electron microscope (SEM).

A raw material forming the dielectric layer 211 is not particularly limited as long as the raw material may obtain sufficient capacitance. For example, a barium titanate-based material, a lead composite perovskite-based material, a strontium titanate-based material, or the like may be used. The barium titanate-based material may include $BaTiO_3$-based ceramic powder. An example of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, $Ba(Ti_{1-y}Zr_y)$ $O_3$ $(0<y<1)$, or the like in which Ca (calcium), Zr (zirconium), or the like is partially dissolved in $BaTiO_3$. A material forming the dielectric layer 211 may include a material in which various ceramic additives, organic solvents, plasticizers, binders, dispersants, and the like are added to a powder such as barium titanate ($BaTiO_3$) or the like depending on a purpose of the present disclosure.

First and second cover portions 212 and 213 of predetermined thicknesses may be formed at a lower portion of a lowermost internal electrode and an upper portion of an uppermost internal electrode of the body 210. In this case, the first and second cover portions 212 and 213 may be made of the same composition as the dielectric layer 211, and may be formed by respectively stacking at least one dielectric layer that does not include the internal electrode at the upper portion of the uppermost internal electrode and the lower portion of the lowermost internal electrode of the body 210.

As an example of the present disclosure, an identification portion (not shown) may be disposed above or on the first cover portion 212 or the second cover portion 213 if necessary. The identification portion may be formed at either the first cover portion 212 or the second cover portion 213, and may function to identify upper and lower portions of the body 210 by a difference in brightness or color. The identification portion may be a dielectric layer in which one ceramic green sheet is fired or a plurality of ceramic green sheets are stacked, and may be included within the first cover portion 212 or the second cover portion 213.

A method of making the identification portion have the difference in brightness or color from the first or second cover portions 212 and 213 is not particularly limited. The identification portion may be formed using a ceramic particle that is different in size from a ceramic particle included in the body, or may be formed by adding a component such as an oxide of one or more metals selected from the group consisting of Ni, Mn, Cr, Mg, Y, V, $BaSiO_3$, and $CaSiO_3$, or the like to a ceramic component. The identification portion may be formed using a laser marking method or the like, but the present disclosure is not limited thereto.

A thickness of the body 210 may be 100 μm or less. The thickness of the body 210 may be an average vertical distance between the first surface S1 and the second surface S2, and a lower limit of the thickness of the body 210 is not particularly limited, but may be, for example, 5 μm or more. By manufacturing the body 210 having a thickness of 100 μm or less, the multi-layered ceramic capacitor according to the present disclosure may be applied to a multi-layered ceramic capacitor for embedding a substrate and/or a capacitor that may be mounted as a land side capacitor (LSC) type at a lower end portion of an AP.

The internal electrodes 221 and 222 may include the first and second internal electrodes 221 and 222 that are alternately disposed to face each other with the dielectric layer 211 therebetween.

The first and second internal electrodes 221 and 222 may include the largest amount of nickel (Ni), but the present disclosure is not limited thereto. For example, the first and second internal electrodes 221 and 222 may be formed using a conductive paste including one or more materials selected from the group consisting of silver (Ag), palladium (Pd), gold (Au), platinum (Pt), nickel (Ni), tin (Sn), copper (Cu), tungsten (W), titanium (Ti), and alloys thereof. A printing method of the conductive paste may be a screen printing method, a gravure printing method, or the like, but the present disclosure is not limited thereto.

Unlike the multi-layered ceramic capacitor 100 according to the above-described embodiment, according to the present embodiment, the first and second external electrodes 241 and 242 may be respectively disposed on the third and fourth surfaces S3 and S4 of the body 210 facing each other in the Y direction (the width direction), and may extend to the second surface S2. Specifically, the first external electrode 241 may be disposed on the third surface S3, and may extend to the second surface S2. The second external electrode 242 may be disposed on the fourth surface S4, and may extend to the second surface S2.

Hereinafter, with reference to FIGS. 11 and 12, a structure of the external electrode will be described based on the first external electrode 241, but this may be equally applied to the second external electrode 242.

Figure 11:
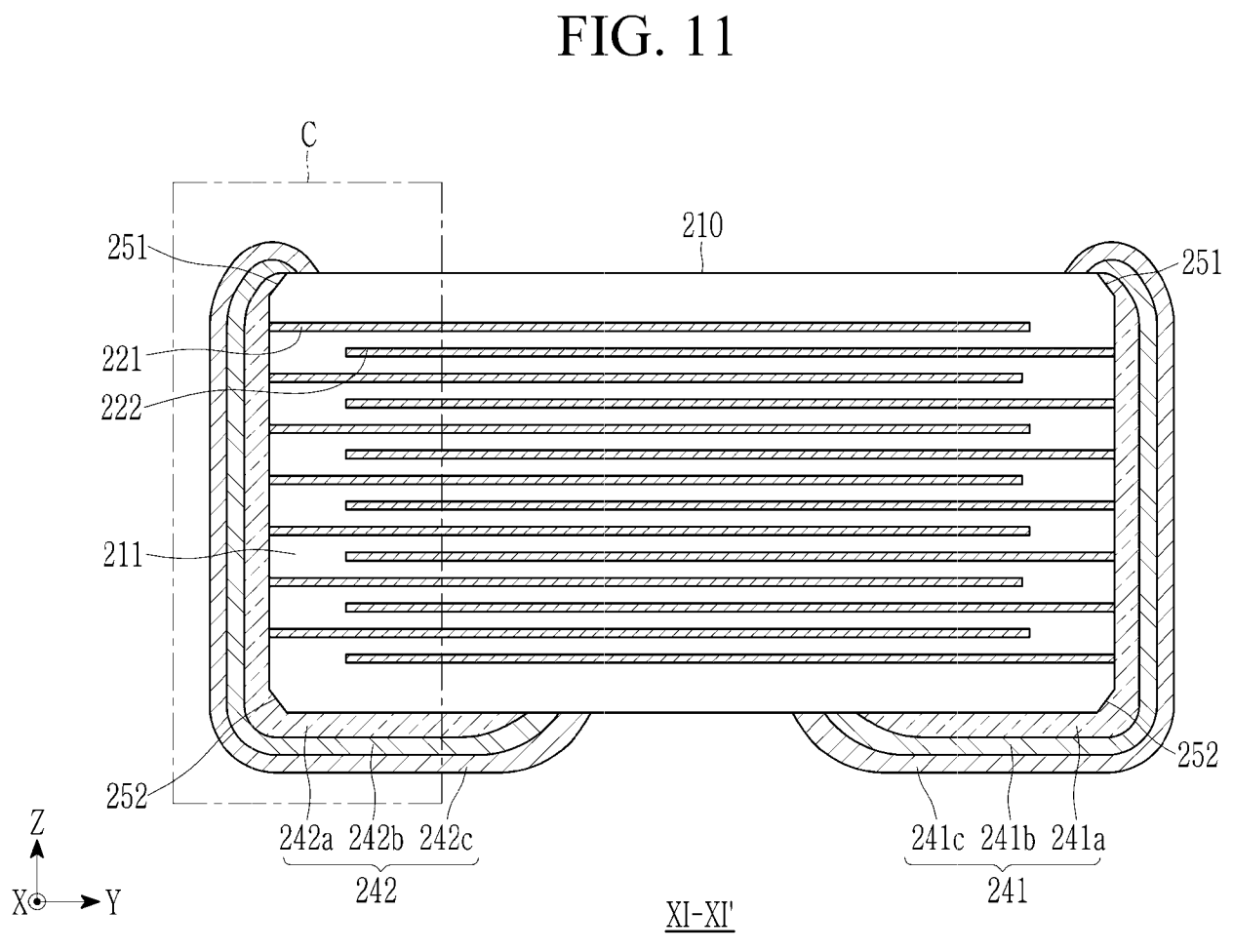
Figure 12:
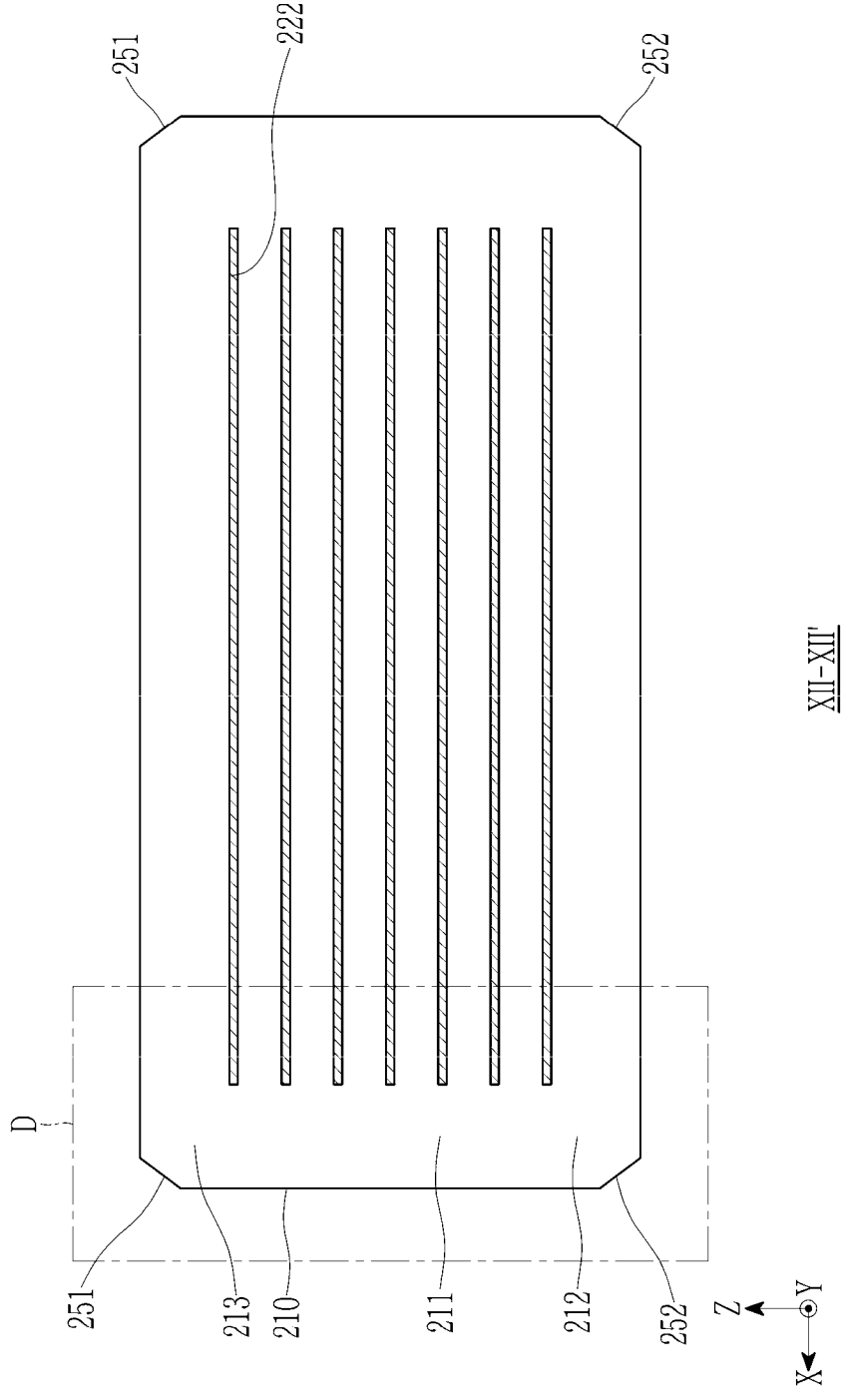
FIG. 12 is a cross-sectional view taken along a line XII-XII' of FIG. 8.

FIG. 11 is a cross-sectional view taken along a line XI-XI' of FIG. 8, and FIG. 12 is a cross-sectional view taken along a line XII-XII' of FIG. 8.

Referring to FIG. 11 and FIG. 12, the first external electrode 241 may include an electrode layer 241a, a first plating layer 241b disposed on the electrode layer 241a, and a second plating layer 241c disposed on the first plating layer 241b. The electrode layer 241a may include one or more materials selected from the group consisting of silver (Ag), palladium (Pd), gold (Au), platinum (Pt), nickel (Ni), copper (Cu), tin (Sn), tungsten (W), titanium (Ti), and alloys thereof. For example, the electrode layer 241a may be a fired electrode formed by firing a conductive paste including nickel (Ni). When the external electrode is formed as the fired electrode like the electrode layer 241a, the body and the internal electrode may be simultaneously fired, and a fixing strength between the body and the external electrode may be further improved.

The first plating layer 241b according to the present embodiment may be a plating layer including nickel, and the second plating layer 241c may be a plating layer including copper or tin. The first plating layer 241b may include nickel so that it improves adhesion between the first plating layer 241b and the electrode layer 241a. Additionally, because the second plating layer 241c includes copper or tin, the external electrode with excellent conductivity, plating adhesion, and solderability may be formed.

Hereinafter, the first inclined portion 251 and the second inclined portion 252 will be described with reference to FIGS. 11 to 14.

Referring to FIG. 11 and FIG. 12, the body 210 may include the first inclined portion 251 in which upper surface (the first surface) edge regions are chamfered. The body 210 may include the first inclined portion 251 in which corner regions of the first surface S1 is chamfered. The first inclined portion 251 may be formed on the first surface S1 of the body 210 and a surface of the first inclined portion 251 connected to the first surface S1. For example, the first inclined portion 251 may be disposed at a corner region connecting the first and third surfaces S1 and S3, the first and fourth surfaces S1 and S4, the first and fifth surfaces S1 and S5, and the first and sixth surfaces S1 and S6 of the body 210. The first inclined portion 251 may extend along the X direction (the length direction) and the Y direction (the width direction). For example, the first inclined portion 251 may extend to surround an edge of the first surface S1 of the body 210. The first inclined portion 251 may have a shape inclined toward a central portion of the body 210 as it goes toward the outside of the body 210 along the Z direction (the thickness direction).

Additionally, the body 210 may include the second inclined portion 252 in which a lower surface (the second surface) edge regions are chamfered. The body 210 may include the second inclined portion 252 in which corner regions of the second surface S2 are chamfered. The second inclined portion 252 may be formed on the second surface S2 of the body 210 and a surface connected to the second surface S2. For example, the second inclined portion 252 may be disposed at a corner region connecting the second and third surfaces S2 and S3, the second and fourth surfaces S2 and S4, the second and fifth surfaces S2 and S5, and the second and sixth surfaces S2 and S6 of the body 210. The second inclined portion 252 may extend along the X direction (the length direction) and the Y direction (the width direction). For example, the second inclined portion 252 may extend to surround an edge of the second surface S2 of the body 210. The second inclined portion 252 may have a shape inclined toward the central portion of the body 210 as it goes toward the outside of the body 210 along the Z direction (the thickness direction).

Figure 13:
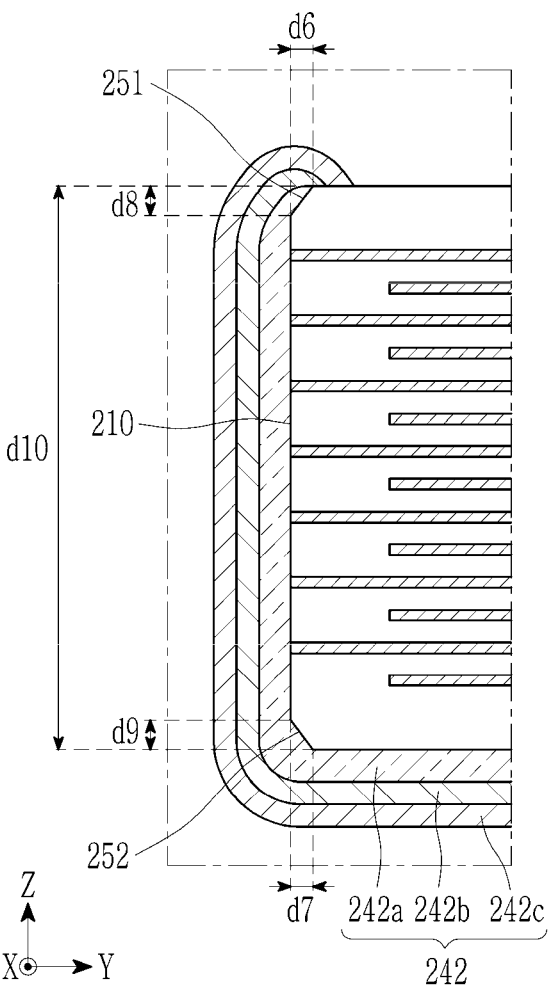
FIG. 13 is an enlarged cross-sectional view of a portion C of FIG. 11.
Figure 14:
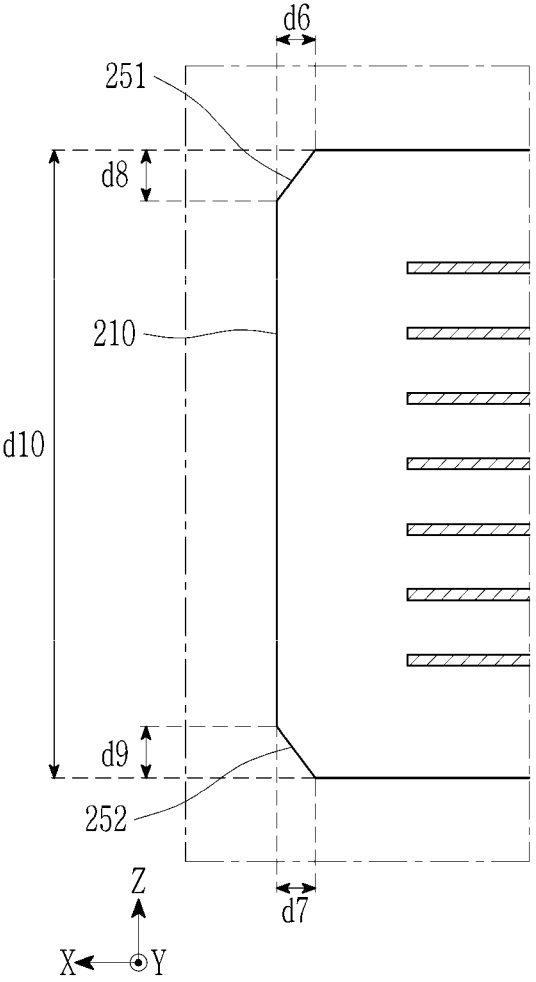
FIG. 14 is an enlarged cross-sectional view of a portion D of FIG. 12.

FIG. 13 is an enlarged cross-sectional view of a portion C of FIG. 11, and FIG. 14 is an enlarged cross-sectional view of a portion D of FIG. 12.

Hereinafter, sixth to tenth lengths d6, d7, d8, d9, and d10 may be measured by observing using an optical microscope, a scanning electron microscope, or the like.

Referring to FIG. 13 and FIG. 14, a ratio of the sixth length d6 of the first inclined portion 251 to the seventh length d7 of the second inclined portion 252 may be about 0.67 to about 1.5.

Referring to FIG. 13, the sixth length d6 may be a value measured along the Y direction (the width direction) from a point where a straight line passing through a center of the Z direction (the thickness direction) of an outer surface of the Y direction (the width direction) of the body 210 and the first inclined portion 251 meet to a point where a straight line passing through a center of the Y direction (the width direction) of an outer surface of the Z direction (the thickness direction) of the body 210 and the first inclined portion 251 meet in a Y-Z direction cross-section passing through a center point of the X direction (the length direction) of the multi-layered ceramic capacitor 200. In addition, the seventh length d7 may be a value measured along the Y direction (the width direction) from a point where the straight line passing through the center of the Z direction (the thickness direction) of the outer surface of the Y direction (the width direction) of the body 210 and the second inclined portion 252 meet to a point where the straight line passing through the center of the Y direction (the width direction) of the outer surface of the Z direction (the thickness direction) of the body 210 and the second inclined portion 252 meet in the Y-Z direction cross-section passing through the center point of the X direction (the length direction) of the multi-layered ceramic capacitor 200.

In addition, referring to FIG. 14, the sixth length d6 may be a value measured along the X direction (the length direction) from a point where a straight line passing through a center of the Z direction (the thickness direction) of an outer surface of the X direction (the length direction) of the body 210 and the first inclined portion 251 meet to a point where a straight line passing through a center of the X direction (the length direction) of an outer surface of the Z direction (the thickness direction) of the body 210 and the first inclined portion 251 meet in an X-Z direction cross-section passing through a center point of the Y direction (the width direction) of the multi-layered ceramic capacitor 200. In addition, the seventh length d7 may be a value measured along the X direction (the length direction) from a point where the straight line passing through the center of the Z direction (the thickness direction) of the outer surface of the X direction (the length direction) of the body 210 and the second inclined portion 252 meet to a point where the straight line passing through the center of the X direction (the length direction) of the outer surface of the Z direction (the thickness direction) of the body 210 and the second inclined portion 252 meet in the X-Z direction cross-section passing through the center point of the Y direction (the width direction) of the multi-layered ceramic capacitor 200.

A ratio of the eighth length d8 of the first inclined portion 251 to the ninth length d9 of the second inclined portion 252 may be 0.4 to 2.5.

Referring to FIG. 13, the eighth length d8 may be a value measured along the Z direction (the thickness direction) from the point where the straight line passing through the center of the Y direction (the width direction) of the outer surface of the Z direction (the thickness direction) of the body 210 and the first inclined portion 251 meet to the point where the straight line passing through the direction (the width direction) of the body 210 and the first inclined portion 251 meet in the Y-Z direction cross-section passing through the center point of the X direction (the length direction) of the multi-layered ceramic capacitor 200. In addition, the ninth length d9 may be a value measured along the Z direction (the thickness direction) from the point where the straight line passing through the center of the Y direction (the width direction) of the outer surface of the Z direction (the thickness direction) of the body 210 and the second inclined portion 252 meet to the point where the straight line passing through the center of the Z direction (the thickness direction) of the outer surface of the Y direction (the width direction) of the body 210 and the second inclined portion 252 meet in the Y-Z direction cross-section passing through the center point of the X direction (the length direction) of the multi-layered ceramic capacitor 200.

In addition, referring to FIG. 14, the eighth length d8 may be a value measured along the Z direction (the thickness direction) from the point where the straight line passing through the center of the X direction (the length direction) of the outer surface of the Z direction (the thickness direction) of the body 210 and the first inclined portion 251 meet to the point where the straight line passing through the center of the Z direction (the thickness direction) of the outer surface of the X direction (the length direction) of the body 210 and the first inclined portion 251 meet in the X-Z direction cross-section passing through the center point of the Y direction (the width direction) of the multi-layered ceramic capacitor 200. In addition, the ninth length d9 may be a value measured along the Z direction (the thickness direction) from the point where the straight line passing through the center of the X direction (the length direction) of the outer surface of the Z direction (the thickness direction) of the body 210 and the second inclined portion 252 meet to the point where the straight line passing through the center of the Z direction (the thickness direction) of the outer surface of the X direction (the length direction) of the body 210 and the second inclined portion 252 meet in the X-Z direction cross-section passing through the center point of the Y direction (the width direction) of the multi-layered ceramic capacitor 200.

Additionally, a ratio of the eighth length d8 to the tenth length d10 from an upper surface to a lower surface of the body 210 along the Z direction (the thickness direction) may be 0.17 to 0.42. In addition, a ratio of the ninth length d9 to the tenth length d10 may be 0.17 to 0.42.

Referring to FIG. 13, the tenth length d10 may be a value measured along the Z direction (the thickness direction) from the point where the straight line passing through the center of the Y direction (the width direction) of the outer surface of the Z direction (the thickness direction) of the body 210 and the first inclined portion 251 meet to the point where the straight line passing through the center of the Y direction (the width direction) of the outer surface of the Z direction (the thickness direction) of the body 210 and the second inclined portion 252 meet in the Y-Z direction cross-section passing through the center point of the X direction (the length direction) of the multi-layered ceramic capacitor 200.

In addition, referring to FIG. 14, the tenth length d10 may be a value measured along the Z direction (the thickness direction) from the point where the straight line passing through the center of the X direction (the length direction) of the outer surface of the Z direction (the thickness direction) of the body 210 and the first inclined portion 251 meet to a point where the straight line passing through the center of the X direction (the length direction) of the outer surface of the Z direction (the thickness direction) of the body 210 and the second inclined portion 252 meet in the X-Z direction cross-section passing through the center point of the Y direction (the width direction) of the multi-layered ceramic capacitor 200.

The tenth length d10 may be a length along the Z direction (the thickness direction) from the first surface S1 to the second surface S2.

TABLE 2

| d6 | d7 | d8 | d9 | d10 | $\frac{d6}{d7}$ | $\frac{d8}{d9}$ | $\frac{d8}{d10}$ | $\frac{d9}{d10}$ | Prevention of chipping |
|----|----|----|----|-----|------|------|-------|-------|------|
| 5 | 5 | 15 | 15 | 60 | 1.0 | 1.0 | 0.250 | 0.250 | OK |
| 5 | 5 | 15 | 20 | 60 | 1.0 | 0.8 | 0.250 | 0.333 | OK |
| 5 | 5 | 15 | 25 | 60 | 1.0 | 0.6 | 0.250 | 0.417 | OK |
| 5 | 5 | 20 | 25 | 60 | 1.0 | 0.8 | 0.333 | 0.417 | OK |
| 5 | 10 | 15 | 15 | 60 | 0.5 | 1.0 | 0.250 | 0.250 | OK |
| 5 | 10 | 15 | 20 | 60 | 0.5 | 0.8 | 0.250 | 0.333 | OK |
| 5 | 10 | 15 | 25 | 60 | 0.5 | 0.6 | 0.250 | 0.417 | OK |
| 5 | 10 | 20 | 25 | 60 | 0.5 | 0.8 | 0.333 | 0.417 | NG |
| 5 | 15 | 15 | 15 | 60 | 0.3 | 1.0 | 0.250 | 0.250 | OK |
| 5 | 15 | 15 | 20 | 60 | 0.3 | 0.8 | 0.250 | 0.333 | OK |
| 5 | 15 | 15 | 25 | 60 | 0.3 | 0.6 | 0.250 | 0.417 | OK |
| 5 | 15 | 20 | 25 | 60 | 0.3 | 0.8 | 0.333 | 0.417 | NG |
| 10 | 10 | 15 | 15 | 60 | 1.0 | 1.0 | 0.250 | 0.250 | OK |
| 10 | 10 | 15 | 20 | 60 | 1.0 | 0.8 | 0.250 | 0.333 | OK |
| 10 | 10 | 15 | 25 | 60 | 1.0 | 0.6 | 0.250 | 0.417 | OK |
| 10 | 10 | 20 | 25 | 60 | 1.0 | 0.8 | 0.333 | 0.417 | NG |
| 10 | 10 | 20 | 20 | 60 | 1.0 | 1.0 | 0.333 | 0.333 | OK |
| 10 | 10 | 25 | 15 | 60 | 1.0 | 1.7 | 0.417 | 0.250 | OK |

18

TABLE 2-continued

| d6 | d7 | d8 | d9 | d10 | $\frac{d6}{d7}$ | $\frac{d8}{d9}$ | $\frac{d8}{d10}$ | $\frac{d9}{d10}$ | Prevention of chipping |
|----|----|----|----|-----|------|------|-------|-------|------|
| 10 | 15 | 20 | 20 | 60 | 0.7 | 1.0 | 0.333 | 0.333 | OK |
| 10 | 15 | 20 | 25 | 60 | 0.7 | 0.8 | 0.333 | 0.417 | NG |
| 10 | 15 | 25 | 15 | 60 | 0.7 | 1.7 | 0.417 | 0.250 | OK |
| 10 | 15 | 25 | 20 | 60 | 0.7 | 1.3 | 0.417 | 0.333 | NG |
| 15 | 15 | 15 | 15 | 60 | 1.0 | 1.0 | 0.250 | 0.250 | NG |
| 15 | 15 | 15 | 20 | 60 | 1.0 | 0.8 | 0.250 | 0.333 | NG |
| 15 | 15 | 15 | 25 | 60 | 1.0 | 0.6 | 0.250 | 0.417 | NG |
| 15 | 15 | 20 | 20 | 60 | 1.0 | 1.0 | 0.333 | 0.333 | NG |
| 15 | 15 | 20 | 25 | 60 | 1.0 | 0.8 | 0.333 | 0.417 | NG |

According to the multi-layered ceramic capacitor 200 including the first inclined portion 251 and the second inclined portion 252 that satisfies the above-described ratio of Table 2, a phenomenon in which a corner portion of the multi-layered ceramic capacitor is broken may be prevented, and moisture resistance reliability may be improved. If a ratio of the sixth length d6 to the seventh length d7 is less than 0.67 or greater than 1.5, poor appearance and poor moisture resistance reliability may occur. Likewise, if a ratio of the eighth length d8 to the ninth length d9 is less than 0.4 or greater than 2.5, poor appearance and poor moisture resistance reliability may occur. Additionally, if a ratio of the eighth length d8 to the tenth length d10 or a ratio of the ninth length d9 to the tenth length d10 is less than 0.17 or greater than 0.42, it may be difficult to prevent the phenomenon in which the corner portion of the multi-layered ceramic capacitor is broken, and poor appearance and poor moisture resistance reliability may occur.

Hereinafter, with reference to FIGS. 15 to 21, a multi-layered ceramic capacitor 300 according to another embodiment of the present disclosure will be described in detail.

Figure 15:
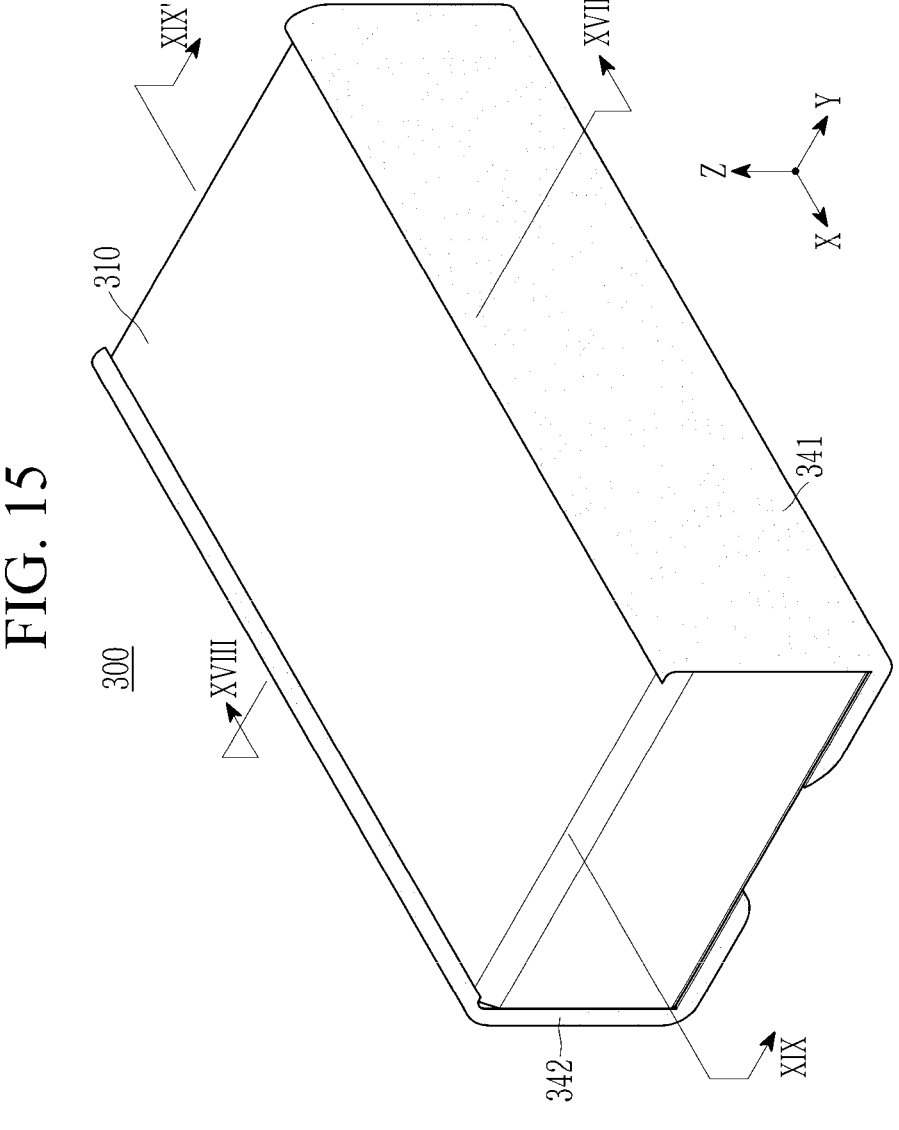
FIG. 15 is a perspective view schematically showing a multi-layered ceramic capacitor according to another embodiment of the present disclosure.
Figure 16:
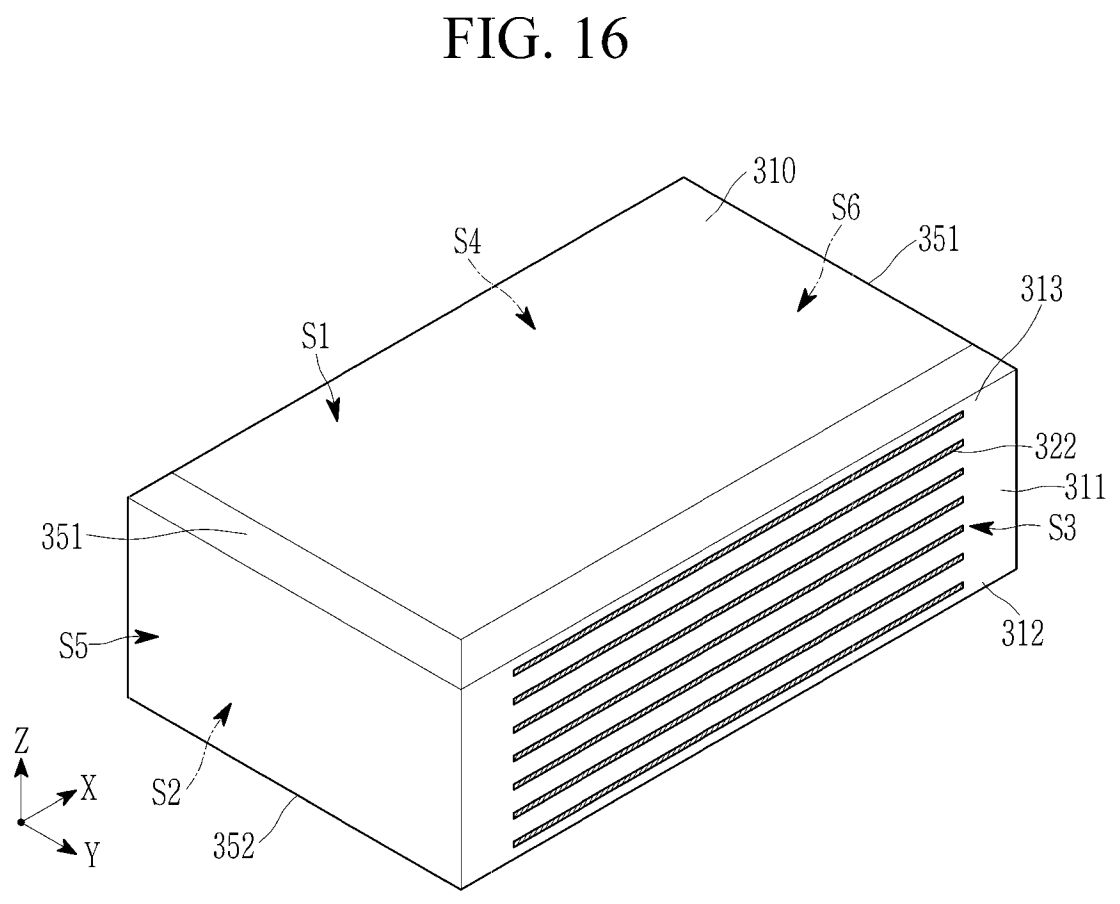
Figure 17:
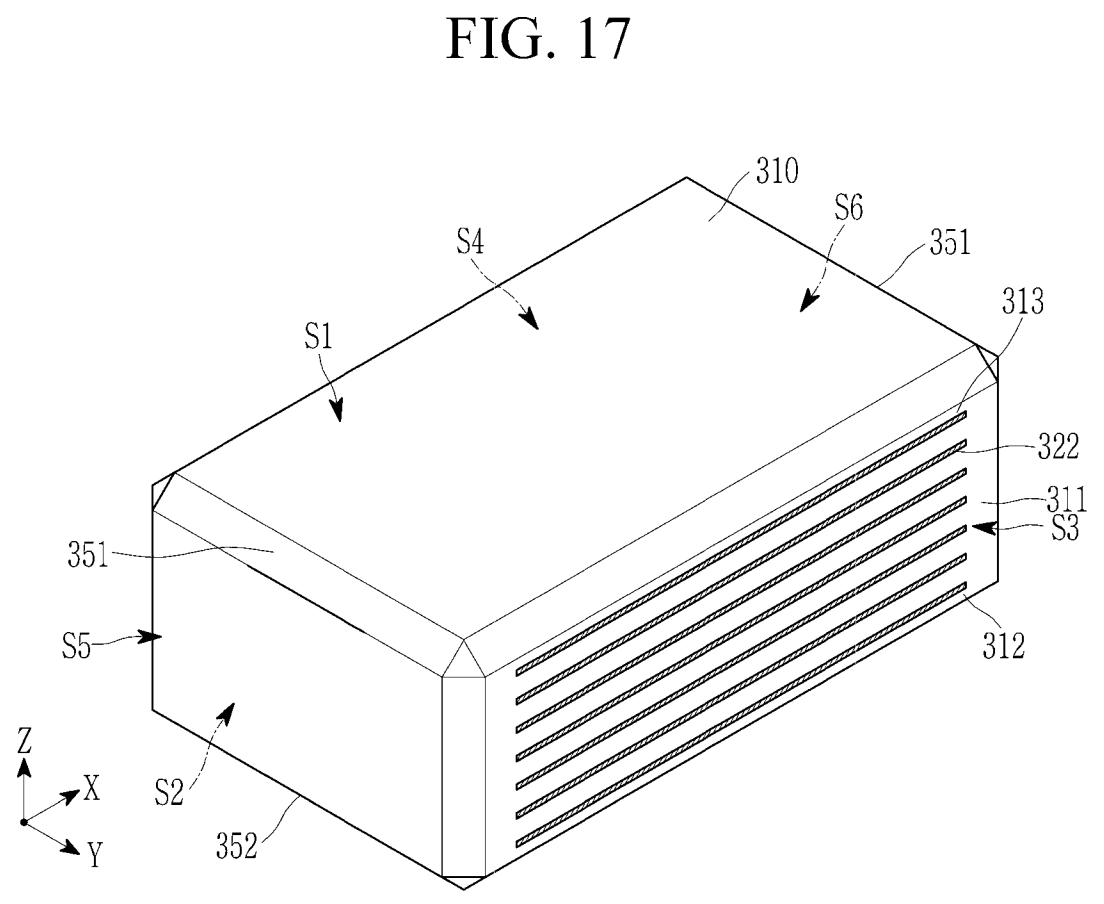

FIG. 15 is a perspective view schematically showing the multi-layered ceramic capacitor according to the other embodiment of the present disclosure, and FIG. 16 and FIG. 17 are perspective views schematically showing a body of the multi-layered ceramic capacitor according to the other embodiment.

The multi-layered ceramic capacitor 300 according to the other embodiment of the present disclosure may include a body 310 that includes dielectric layers 311 stacked in the Z direction (the thickness direction) and first and second internal electrodes 321 and 322 interposed between the dielectric layers 311 and includes first and second surfaces S1 and S2 facing each other in the Z direction (the thickness direction), third and fourth surfaces S3 and S4 facing each other in the Y direction (the width direction) perpendicular to the Z direction (the thickness direction), and fifth and sixth surfaces S5 and S6 facing each other in the X direction (the length direction) perpendicular to the Z direction (the thickness direction) and the Y direction (the width direction), a first external electrode 341 disposed at the outside of the body 310 and electrically connected to the first internal electrode 321, and a second external electrode 342 electrically connected to the second internal electrode 322 and disposed to face the first external electrode 341 in the Y direction (the width direction). The body 310 may include a first inclined portion 351 in which a corner region of the first surface S1 is chamfered and a second inclined portion 352 in which a corner region of the second surface S2 is chamfered.

The multi-layered ceramic capacitor 300 according to the present embodiment may have a thickness of 100 μm or less. A thickness of the multi-layered ceramic capacitor 300 may be a value obtained by measuring a maximum straight line distance from a point on an upper surface of the multi-layered ceramic capacitor 300 to a lower surface of the multi-layered ceramic capacitor 300 along the Z direction (the thickness direction).

The body 310 may include the dielectric layers 311 and the internal electrodes 321 and 322 alternately stacked. There is no particular limitation on a specific shape of the body 310, but as shown in the drawings, the body 310 may have a hexahedral shape or a shape similar to the hexahedral shape. Due to shrinkage of ceramic powder included in the body 310 during a firing process, the body 310 does not have a hexahedral shape with a completely straight line, but may have a substantially hexahedral shape. For example, the body 310 may have a thickness along the Z direction with a predetermined size, a length along the X direction, and a width along the Y direction, and may have the substantially hexahedral shape with the thickness less than the width.

The body 310 may have the first and second surfaces S1 and S2 facing each other in the Z direction (the thickness direction), the third and fourth surfaces S3 and S4 connected to the first and second surfaces S1 and S2 and facing each other in the Y direction (the width direction), and the fifth and sixth surfaces S5 and S6 connected to the first and second surfaces S1 and S2 and the third and fourth surfaces S3 and S4 and facing each other in the X direction (the length direction). In this case, one surface selected from among the first, second, third, and fourth surfaces S1, S2, S3, and S4 may be a mounting surface. Referring to FIG. 16, the body 310 may include the inclined portions 351 and 352 at a portion of a corner region where both surfaces are connected. In addition, referring to FIG. 17, the body 310 may include the inclined portion at the corner region where both surfaces are connected.

Lengths of the third surface S3 and the fourth surface S4 of the body 310 along the X direction (the length direction) may be greater than widths of the fifth surface S5 and the sixth surface S6 of the body 310 along the Y direction (the width direction).

The body 310 may be formed by stacking a plurality of dielectric layers 311 in the Z direction (the thickness direction) and then firing the stacked dielectric layers, and a boundary between adjacent dielectric layers 311 may be integrated to an extent that it is difficult to check without using a scanning electron microscope (SEM).

A raw material forming the dielectric layer 311 is not particularly limited as long as the raw material may obtain sufficient capacitance. For example, a barium titanate-based material, a lead composite perovskite-based material, a strontium titanate-based material, or the like may be used. The barium titanate-based material may include $BaTiO_3$-based ceramic powder. An example of the ceramic powder may include $(Ba_{1-x}Ca_x)TiO_3$, $Ba(Ti_{1-y}Ca_y) O_3$, $(Ba_{1-x}Ca_x) (Ti_{1-y}Zr_y) O_3$, $Ba(Ti_{1-y}Zr_y)O_3$, or the like in which Ca (calcium), Zr (zirconium), or the like is partially dissolved in $BaTiO_3$. A material forming the dielectric layer 311 may include a material in which various ceramic additives, organic solvents, plasticizers, binders, dispersants, and the like are added to a powder such as barium titanate ($BaTiO_3$) or the like depending on a purpose of the present disclosure.

First and second cover portions 312 and 313 of predetermined thicknesses may be formed at a lower portion of a lowermost internal electrode and an upper portion of an uppermost internal electrode of the body 310. In this case, the first and second cover portions 312 and 313 may be made of the same composition as the dielectric layer 311, and may be formed by respectively stacking at least one dielectric layer that does not include the internal electrode at the upper portion of the uppermost internal electrode and the lower portion of the lowermost internal electrode of the body 310.

As an example of the present disclosure, an identification portion (not shown) may be disposed above or on the first cover portion 312 or the second cover portion 313 if necessary. The identification portion may be formed at either the first cover portion 312 or the second cover portion 313, and may function to identify upper and lower portions of the body 310 by a difference in brightness or color. The identification portion may be a dielectric layer in which one ceramic green sheet is fired or a plurality of ceramic green sheets are stacked, and may be included within the first cover portion 312 or the second cover portion 313.

A method of making the identification portion have the difference in brightness or color from the first or second cover portions 312 and 313 is not particularly limited. The identification portion may be formed using a ceramic particle that is different in size from a ceramic particle included in the body, or may be formed by adding a component such as an oxide of one or more metals selected from Ni, Mn, Cr, Mg, Y, and V, $BaSiO_3$, $CaSiO_3$, or the like to a ceramic component. The identification portion may be formed using a laser marking method or the like, but the present disclosure is not limited thereto.

A thickness of the body 310 may be 100 μm or less. The thickness of the body 310 may be an average vertical distance between the first surface S1 and the second surface S2, and a lower limit of the thickness of the body 310 is not particularly limited, but may be, for example, 5 μm or more. By manufacturing the body 310 having a thickness of 100 μm or less, the multi-layered ceramic capacitor according to the present disclosure may be applied to a multi-layered ceramic capacitor for embedding a substrate and/or a capacitor that may be mounted as a land side capacitor (LSC) type at a lower end portion of an AP.

The internal electrodes 321 and 322 may include the first and second internal electrodes 321 and 322 that are alternately disposed to face each other with the dielectric layer 311 therebetween.

The first and second internal electrodes 321 and 222 may include the largest amount of nickel (Ni), but the present disclosure is not limited thereto. For example, the first and second internal electrodes 321 and 322 may be formed using a conductive paste including one or more materials of silver (Ag), palladium (Pd), gold (Au), platinum (Pt), nickel (Ni), tin (Sn), copper (Cu), tungsten (W), titanium (Ti), and an alloy thereof. A printing method of the conductive paste may be a screen printing method, a gravure printing method, or the like, but the present disclosure is not limited thereto.

Unlike the multi-layered ceramic capacitor 100 according to the above-described embodiment, according to the present embodiment, the first and second external electrodes 341 and 342 may be respectively disposed on the third and fourth surfaces S3 and S4 of the body 310 facing each other in the Y direction (the width direction), and may extend to the second surface S2. Specifically, the first external electrode 341 may be disposed on the third surface S3, and may extend to the second surface S2. The second external electrode 342 may be disposed on the fourth surface S4, and may extend to the second surface S2.

Hereinafter, with reference to FIGS. 18 and 19, a structure of the external electrode will be described based on the first external electrode 341, but this may be equally applied to the second external electrode 342.

Figure 18:
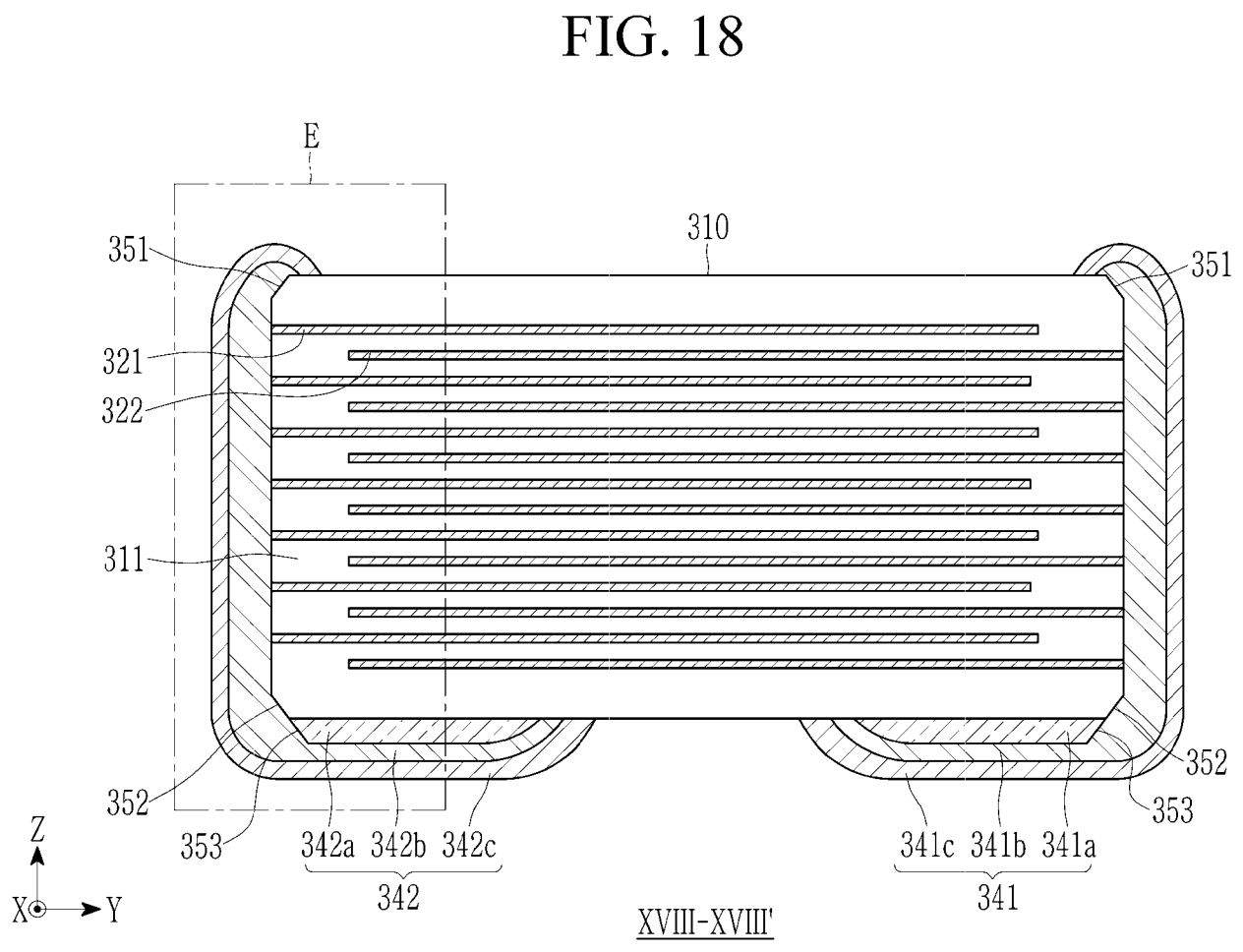
Figure 19:
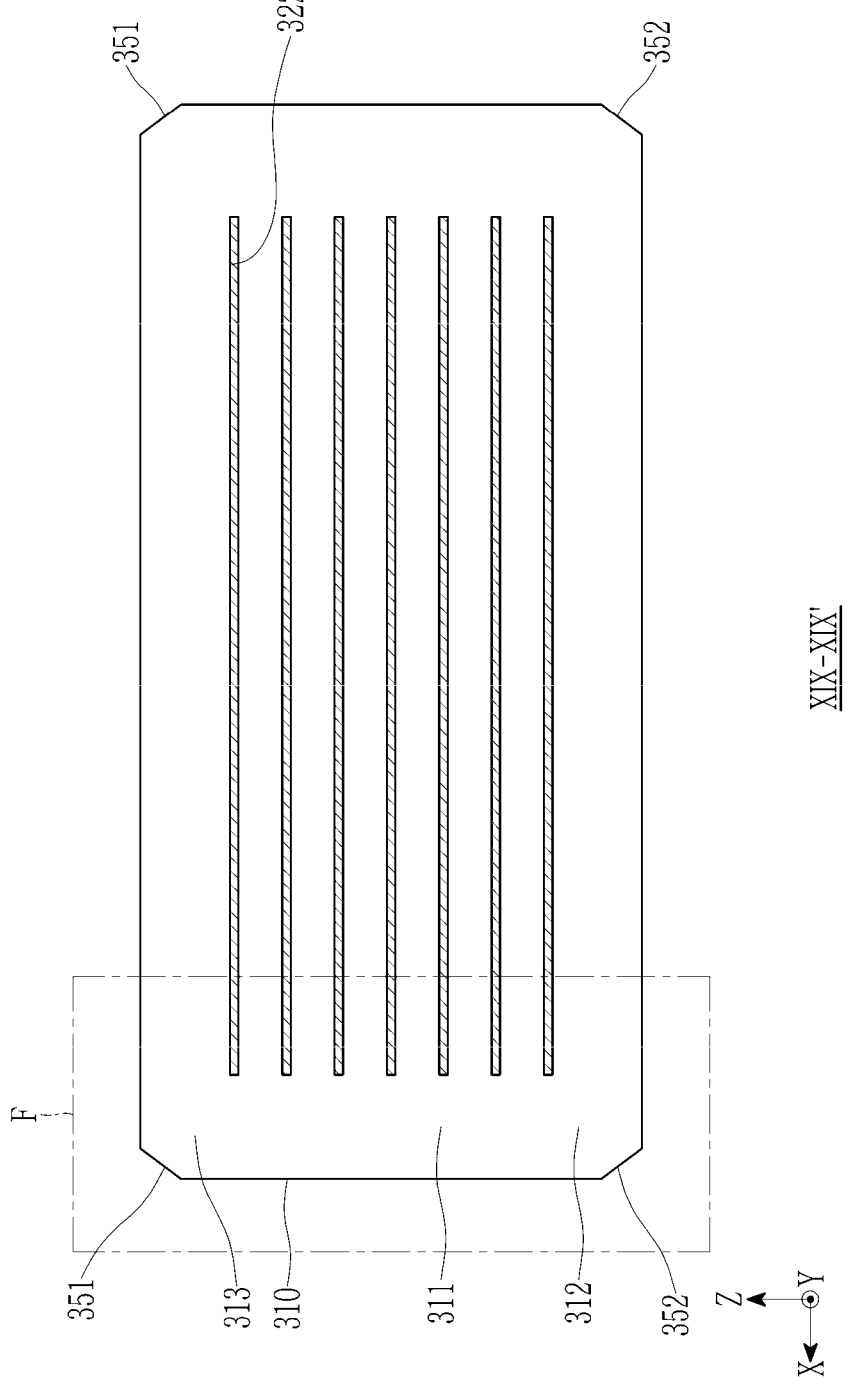
FIG. 19 is a cross-sectional view taken along a line XIX-XIX' of FIG. 15.

FIG. 18 is a cross-sectional view taken along a line XVIII-XVIII' of FIG. 15, and FIG. 19 is a cross-sectional view taken along a line XIX-XIX' of FIG. 15.

Referring to FIG. 18 and FIG. 19, the first external electrode 341 may include an electrode layer 341a, a first plating layer 341b disposed on the electrode layer 341a, and a second plating layer 341c disposed on the first plating layer 341b. The first plating layer 341b and the second plating layer 341c of the first external electrode 341 may be disposed on the third surface S3 of the body 310, and may extend to the second surface S2. Additionally, a first plating layer 342b and a second plating layer 342c of the second external electrode 342 may be disposed on the fourth surface S4 of the body 310, and may extend to the second surface S2.

Unlike the multi-layered ceramic capacitor 200 according to the above-described embodiment, according to the present embodiment, the electrode layer 341a of the first external electrode 341 and an electrode layer 342a of the second external electrode 342 may be disposed on the second surface S2 of the body 310, and may extend in the Y direction (the width direction).

The electrode layer 341a may include one or more materials selected from the group consisting of silver (Ag), palladium (Pd), gold (Au), platinum (Pt), nickel (Ni), copper (Cu), tin (Sn), tungsten (W), titanium (Ti), and an alloy thereof. For example, the electrode layer 341a may be a fired electrode formed by firing a conductive paste including nickel (Ni). When the external electrode is formed as the fired electrode like the electrode layer 341a, the body and the internal electrode may be simultaneously fired, and a fixing strength between the body and the external electrode may be further improved.

The first plating layer 341b according to the present embodiment may be a plating layer including nickel, and the second plating layer 341c may be a plating layer including copper or tin. The first plating layer 341b may include nickel so that it improves adhesion between the first plating layer 341b and the electrode layer 341a. Additionally, because the second plating layer 341c includes copper or tin, the external electrode with excellent conductivity, plating adhesion, and solderability may be formed.

Hereinafter, the first inclined portion 351 and the second inclined portion 352 will be described with reference to FIGS. 18 to 21.

Referring to FIG. 18 and FIG. 19, the body 310 may include the first inclined portion 351 in which an upper surface corner region is chamfered. The body 310 may include the first inclined portion 351 in which a corner region of the first surface S1 is chamfered. The first inclined portion 351 may be disposed on the first surface S1 of the body 210 and a surface connected to the first surface S1. For example, the first inclined portion 351 may be disposed at a corner region connecting the first and third surfaces S1 and S3, the first and fourth surfaces S1 and S4, the first and fifth surfaces S1 and S5, and the first and sixth surfaces S1 and S6 of the body 210. The first inclined portion 351 may extend along the X direction (the length direction) and the Y direction (the width direction). For example, the first inclined portion 351 may extend to surround an edge of the first surface S1 of the body 310. The first inclined portion 351 may have a shape inclined toward a central portion of the body 310 as it goes toward the outside of the body 310 along the Z direction (the thickness direction).

Additionally, the body 310 may include the second inclined portion 352 in which a lower surface corner region is chamfered. The body 310 may include the second inclined portion 352 in which a corner region of the second surface S2 is chamfered. The second inclined portion 352 may be disposed on the second surface S2 of the body 310 and a surface connected to the second surface S2. For example, the second inclined portion 352 may be disposed at a corner region connecting the second and third surfaces S2 and S3, the second and fourth surfaces S2 and S4, the second and fifth surfaces S2 and S5, and the second and sixth surfaces S2 and S6 of the body 310. The second inclined portion 352 may extend along the X direction (the length direction) and the Y direction (the width direction). For example, the second inclined portion 352 may extend to surround an edge of the second surface S2 of the body 310. The second inclined portion 352 may have a shape inclined toward the central portion of the body 310 as it goes toward the outside of the body 310 along the Z direction (the thickness direction). The electrode layer 341a may include a third inclined portion 353 in which a corner region is chamfered. The third inclined portion 353 may be connected to the second inclined portion 352.

Figure 20:
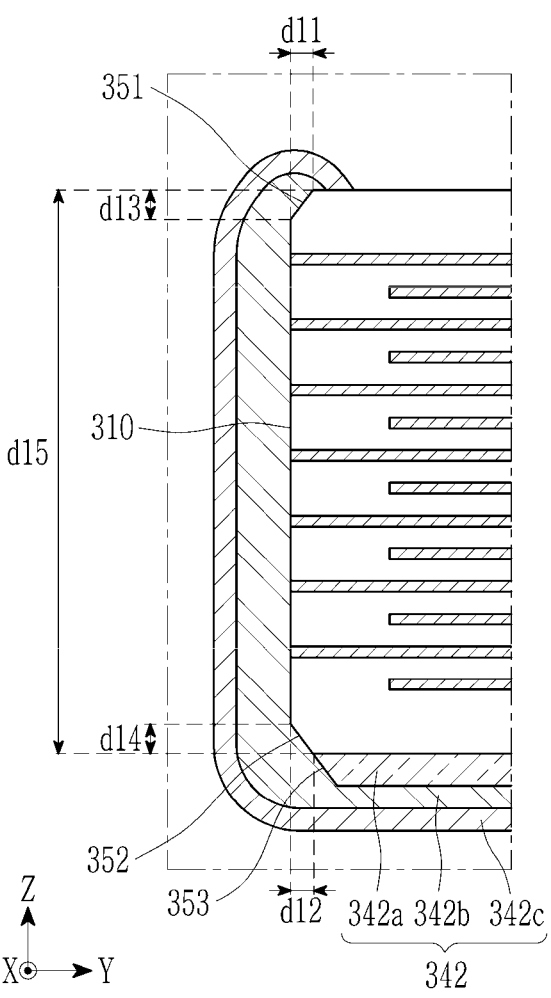
FIG. 20 is an enlarged cross-sectional view of a portion E of FIG. 18.
Figure 21:
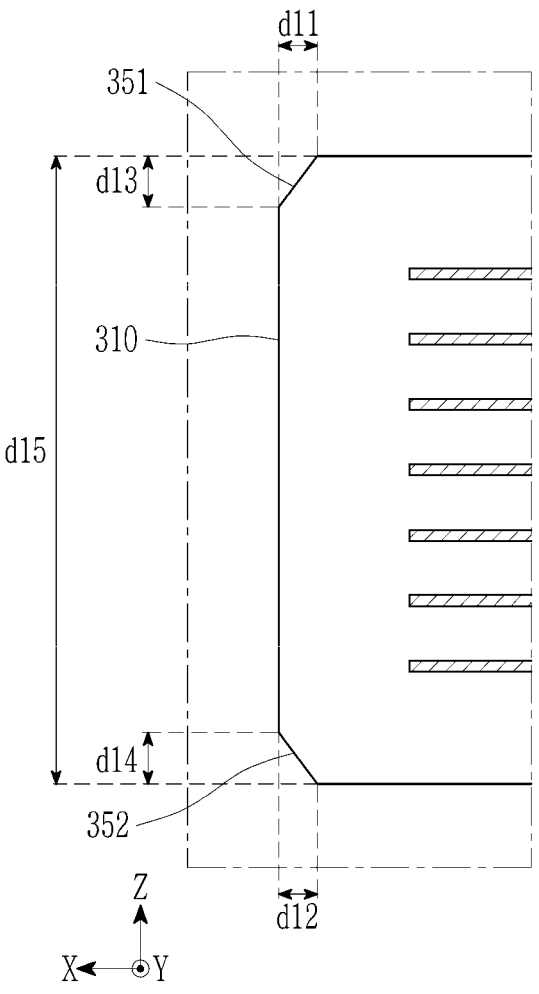
FIG. 21 is an enlarged cross-sectional view of a portion F of FIG. 19.

FIG. 20 is an enlarged cross-sectional view of a portion E of FIG. 18, and FIG. 21 is an enlarged cross-sectional view of a portion F of FIG. 19.

Hereinafter, eleventh to fifteenth lengths d11, d12, d13, d14, and d15 may be measured by observing using an optical microscope, a scanning electron microscope, or the like.

Referring to FIG. 20 and FIG. 21, a ratio of the eleventh length d11 of the first inclined portion 351 to the twelfth length d12 of the second inclined portion 352 may be 0.67 to 1.5.

Referring to FIG. 20, the eleventh length d11 may be a value measured along the Y direction (the width direction) from a point where a straight line passing through a center of the Z direction (the thickness direction) of an outer surface of the Y direction (the width direction) of the body 310 and the first inclined portion 351 meet to a point where a straight line passing through a center of the Y direction (the width direction) of an outer surface of the Z direction (the thickness direction) of the body 310 and the first inclined portion 351 meet in a Y-Z direction cross-section passing through a center point of the X direction (the length direction) of the multi-layered ceramic capacitor 300. In addition, the twelfth length d12 may be a value measured along the Y direction (the width direction) from a point where the straight line passing through the center of the Z direction (the thickness direction) of the outer surface of the Y direction (the width direction) of the body 310 and the second inclined portion 352 meet to a point where the straight line passing through the center of the Y direction (the width direction) of the outer surface of the Z direction (the thickness direction) of the body 310 and the second inclined portion 352 meet in the Y-Z direction cross-section passing through the center point of the X direction (the length direction) of the multi-layered ceramic capacitor 300.

In addition, referring to FIG. 21, the eleventh length d11 may be a value measured along the X direction (the length direction) from a point where a straight line passing through a center of the Z direction (the thickness direction) of an outer surface of the X direction (the length direction) of the body 310 and the first inclined portion 351 meet to a point where a straight line passing through a center of the X direction (the length direction) of an outer surface of the Z direction (the thickness direction) of the body 310 and the first inclined portion 351 meet in an X-Z direction cross-section passing through a center point of the Y direction (the width direction) of the multi-layered ceramic capacitor 300. In addition, the twelfth length d12 may be a value measured along the X direction (the length direction) from a point where the straight line passing through the center of the Z direction (the thickness direction) of the outer surface of the X direction (the length direction) of the body 310 and the second inclined portion 352 meet to a point where the straight line passing through the center of the X direction (the length direction) of the outer surface of the Z direction (the thickness direction) of the body 310 and the second inclined portion 352 meet in the X-Z direction cross-section passing through the center point of the Y direction (the width direction) of the multi-layered ceramic capacitor 300.

A ratio of the thirteenth length d13 of the first inclined portion 351 to the fourteenth length d14 of the second inclined portion 352 may be 0.4 to 2.5.

Referring to FIG. 20, the thirteenth length d13 may be a value measured along the Z direction (the thickness direction) from the point where the straight line passing through the center of the Y direction (the width direction) of the outer surface of the Z direction (the thickness direction) of the body 310 and the first inclined portion 351 meet to the point where the straight line passing through the direction (the width direction) of the body 310 and the first inclined portion 351 meet in the Y-Z direction cross-section passing through the center point of the X direction (the length direction) of the multi-layered ceramic capacitor 300. In addition, the fourteenth length d14 may be a value measured along the Z direction (the thickness direction) from the point where the straight line passing through the center of the Y direction (the width direction) of the outer surface of the Z direction (the thickness direction) of the body 310 and the second inclined portion 352 meet to the point where the straight line passing through the center of the Z direction (the thickness direction) of the outer surface of the Y direction (the width direction) of the body 310 and the second inclined portion 352 meet in the Y-Z direction cross-section passing through the center point of the X direction (the length direction) of the multi-layered ceramic capacitor 300.

In addition, referring to FIG. 21, the thirteenth length d13 may be a value measured along the Z direction (the thickness direction) from the point where the straight line passing through the center of the X direction (the length direction) of the outer surface of the Z direction (the thickness direction) of the body 310 and the first inclined portion 351 meet to the point where the straight line passing through the center of the Z direction (the thickness direction) of the outer surface of the X direction (the length direction) of the body 310 and the first inclined portion 351 meet in the X-Z direction cross-section passing through the center point of the Y direction (the width direction) of the multi-layered ceramic capacitor 300. In addition, the fourteenth length d14 may be a value measured along the Z direction (the thickness direction) from the point where the straight line passing through the center of the X direction (the length direction) of the outer surface of the Z direction (the thickness direction) of the body 310 and the second inclined portion 352 meet to the point where the straight line passing through the center of the Z direction (the thickness direction) of the outer surface of the X direction (the length direction) of the body 310 and the second inclined portion 352 meet in the X-Z direction cross-section passing through the center point of the Y direction (the width direction) of the multi-layered ceramic capacitor 300.

Additionally, a ratio of the thirteenth length d13 to the fifteenth length d15 from an upper surface to a lower surface of the body 310 along the Z direction (the thickness direction) may be 0.17 to 0.42. In addition, a ratio of the fourteenth length d14 to the fifteenth length d15 may be 0.17 to 0.42.

Referring to FIG. 20, the fifteenth length d15 may be a value measured along the Z direction (the thickness direction) from the point where the straight line passing through the center of the Y direction (the width direction) of the outer surface of the Z direction (the thickness direction) of the body 310 and the first inclined portion 351 meet to the point where the straight line passing through the center of the Y direction (the width direction) of the outer surface of the Z direction (the thickness direction) of the body 310 and the second inclined portion 352 meet in the Y-Z direction cross-section passing through the center point of the X direction (the length direction) of the multi-layered ceramic capacitor 300.

In addition, referring to FIG. 21, the fifteenth length d15 may be a value measured along the Z direction (the thickness direction) from the point where the straight line passing through the center of the X direction (the length direction) of the outer surface of the Z direction (the thickness direction) of the body 310 and the first inclined portion 351 meet to a point where the straight line passing through the center of the X direction (the length direction) of the outer surface of the Z direction (the thickness direction) of the body 310 and the second inclined portion 352 meet in the X-Z direction cross-section passing through the center point of the Y direction (the width direction) of the multi-layered ceramic capacitor 300.

The fifteenth length d15 may be a length along the Z direction (the thickness direction) from the first surface S1 to the second surface S2.

TABLE 3

| d11 | d12 | d13 | d14 | d15 | $\frac{d11}{d12}$ | $\frac{d13}{d14}$ | $\frac{d13}{d15}$ | $\frac{d14}{d15}$ | Prevention of chipping | Prevention of electrode exposure |
|---|---|---|---|---|---|---|---|---|---|---|
| 5 | 5 | 15 | 15 | 60 | 1.0 | 1.0 | 0.250 | 0.250 | OK | NG |
| 5 | 5 | 15 | 20 | 60 | 1.0 | 0.8 | 0.250 | 0.333 | OK | NG |
| 5 | 5 | 15 | 25 | 60 | 1.0 | 0.6 | 0.250 | 0.417 | OK | NG |
| 5 | 5 | 20 | 25 | 60 | 1.0 | 0.8 | 0.333 | 0.417 | OK | NG |
| 5 | 10 | 15 | 15 | 60 | 0.5 | 1.0 | 0.250 | 0.250 | OK | NG |
| 5 | 10 | 15 | 20 | 60 | 0.5 | 0.8 | 0.250 | 0.333 | OK | NG |
| 5 | 10 | 15 | 25 | 60 | 0.5 | 0.6 | 0.250 | 0.417 | OK | NG |
| 5 | 10 | 20 | 25 | 60 | 0.5 | 0.8 | 0.333 | 0.417 | NG | OK |
| 5 | 15 | 15 | 15 | 60 | 0.3 | 1.0 | 0.250 | 0.250 | OK | NG |
| 5 | 15 | 15 | 20 | 60 | 0.3 | 0.8 | 0.250 | 0.333 | OK | NG |
| 5 | 15 | 15 | 25 | 60 | 0.3 | 0.6 | 0.250 | 0.417 | OK | NG |
| 5 | 15 | 20 | 25 | 60 | 0.3 | 0.8 | 0.333 | 0.417 | NG | OK |
| 10 | 10 | 15 | 15 | 60 | 1.0 | 1.0 | 0.250 | 0.250 | OK | NG |
| 10 | 10 | 15 | 20 | 60 | 1.0 | 0.8 | 0.250 | 0.333 | OK | NG |
| 10 | 10 | 15 | 25 | 60 | 1.0 | 0.6 | 0.250 | 0.417 | OK | OK |

TABLE 3-continued

| d11 | d12 | d13 | d14 | d15 | $\frac{d11}{d12}$ | $\frac{d13}{d14}$ | $\frac{d13}{d15}$ | $\frac{d14}{d15}$ | Prevention of chipping | Prevention of electrode exposure |
|---|---|---|---|---|---|---|---|---|---|---|
| 10 | 10 | 20 | 25 | 60 | 1.0 | 0.8 | 0.333 | 0.417 | NG | OK |
| 10 | 10 | 20 | 20 | 60 | 1.0 | 1.0 | 0.333 | 0.333 | OK | OK |
| 10 | 10 | 25 | 15 | 60 | 1.0 | 1.7 | 0.417 | 0.250 | OK | OK |
| 10 | 15 | 20 | 20 | 60 | 0.7 | 1.0 | 0.333 | 0.333 | OK | OK |
| 10 | 15 | 20 | 25 | 60 | 0.7 | 0.8 | 0.333 | 0.417 | NG | OK |
| 10 | 15 | 25 | 15 | 60 | 0.7 | 1.7 | 0.417 | 0.250 | OK | OK |
| 10 | 15 | 25 | 20 | 60 | 0.7 | 1.3 | 0.417 | 0.333 | NG | OK |
| 15 | 15 | 15 | 15 | 60 | 1.0 | 1.0 | 0.250 | 0.250 | NG | OK |
| 15 | 15 | 15 | 20 | 60 | 1.0 | 0.8 | 0.250 | 0.333 | NG | OK |
| 15 | 15 | 15 | 25 | 60 | 1.0 | 0.6 | 0.250 | 0.417 | NG | OK |
| 15 | 15 | 20 | 20 | 60 | 1.0 | 1.0 | 0.333 | 0.333 | NG | OK |
| 15 | 15 | 20 | 25 | 60 | 1.0 | 0.8 | 0.333 | 0.417 | NG | OK |

According to the multi-layered ceramic capacitor 300 including the first inclined portion 351 and the second inclined portion 352 that satisfies the above-described ratio of Table 3, a phenomenon in which a corner portion of the multi-layered ceramic capacitor is broken may be prevented, and moisture resistance reliability may be improved. If a ratio of the eleventh length d11 to the twentieth length d12 is less than 0.67 or greater than 1.5, a corner region of the external electrode may be excessively removed so that the external electrode peels off or poor appearance and poor moisture resistance reliability occur. Likewise, if a ratio of the thirteenth length d13 to the fourteenth length d14 is less than 0.4 or greater than 2.5, the corner region of the external electrode may be excessively removed so that the external electrode peels off or poor appearance and poor moisture resistance reliability occur. Additionally, if a ratio of the thirteenth length d13 to the fifteenth length d15 or a ratio of the fourteenth length d14 to the fifteenth length d15 is less than 0.17, it may be difficult to prevent the phenomenon in which the corner portion of the multi-layered ceramic capacitor is broken, and if the ratio of the thirteenth length d13 to the fifteenth length d15 or the ratio of the fourteenth length d14 to the fifteenth length d15 is greater than 0.42, the external electrode may peel off or poor appearance and poor moisture resistance reliability may occur.

FIGS. 22 to 25 are process diagrams showing a method for manufacturing the multi-layered ceramic capacitor shown in FIG. 1. Hereinafter, the method for manufacturing the multi-layered ceramic capacitor shown in FIG. 1 of the present disclosure will be described with reference to FIGS. 22 to 25.

Figure 22:
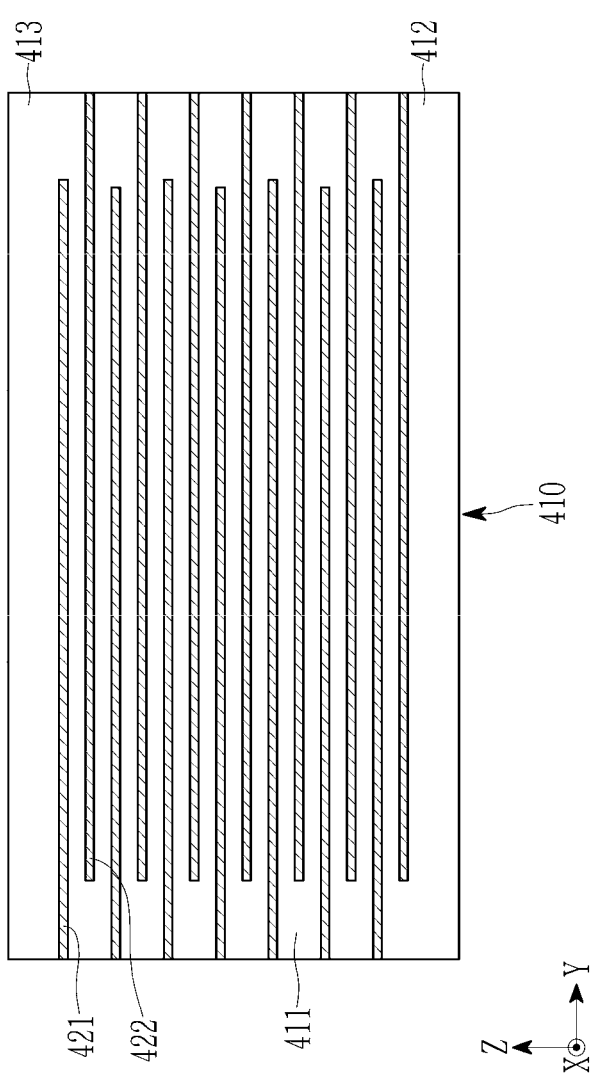
FIGS. 22 to 25 are process diagrams showing a method for manufacturing the multi-layered ceramic capacitor shown in FIG. 1.

As shown in FIG. 22, a sheet printed with a paste including a conductive metal at a predetermined thickness may be stacked in the Z direction (the thickness direction) on one surface of a ceramic green sheet made of a dielectric layer so that a body 410 including dielectric layers 411 and first and second internal electrodes 421 and 422 interposed between the dielectric layers 411 is provided. A first cover portion 412 and a second cover portion 413 may be formed by stacking dielectric layers that do not include the internal electrode at upper and lower portions of the body 410. In this case, an identification portion (not shown) may be formed as necessary.

Figure 23:
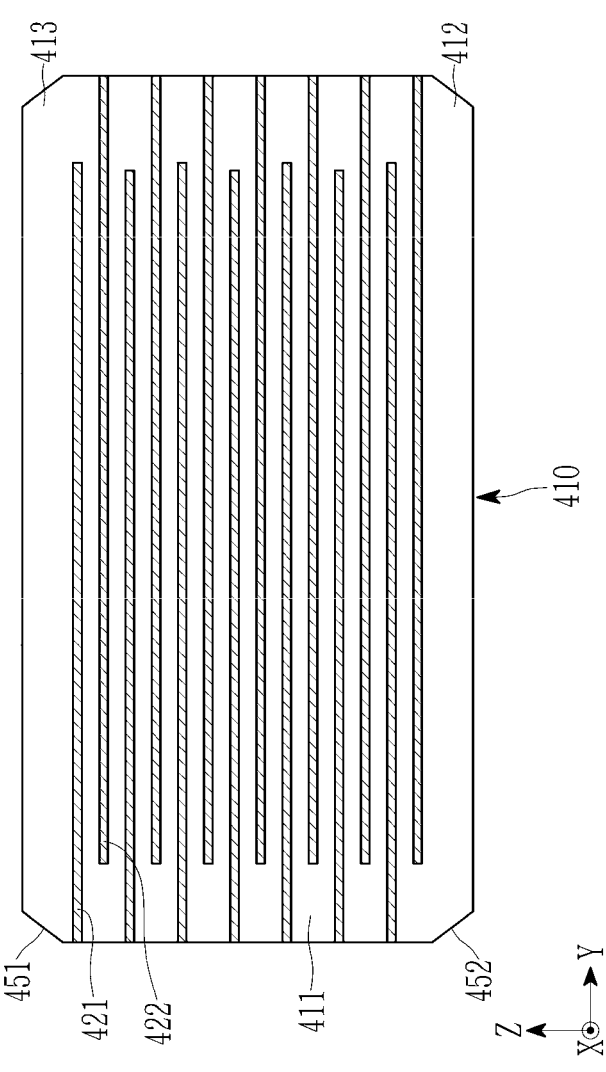

Referring to FIG. 23, after the body 410 is formed, first and second inclined portions 451 and 452 may be formed by chamfering corner regions along the X direction (the length direction) and the Y direction (the width direction) of upper and lower surfaces of the body 410. Specifically, the first and second inclined portions 451 and 452 may be formed by chamfering the corner regions along the X direction (the length direction) and the Y direction (the width direction) of a first surface S1 and a second surface S2 of the body 410.

Figure 24:
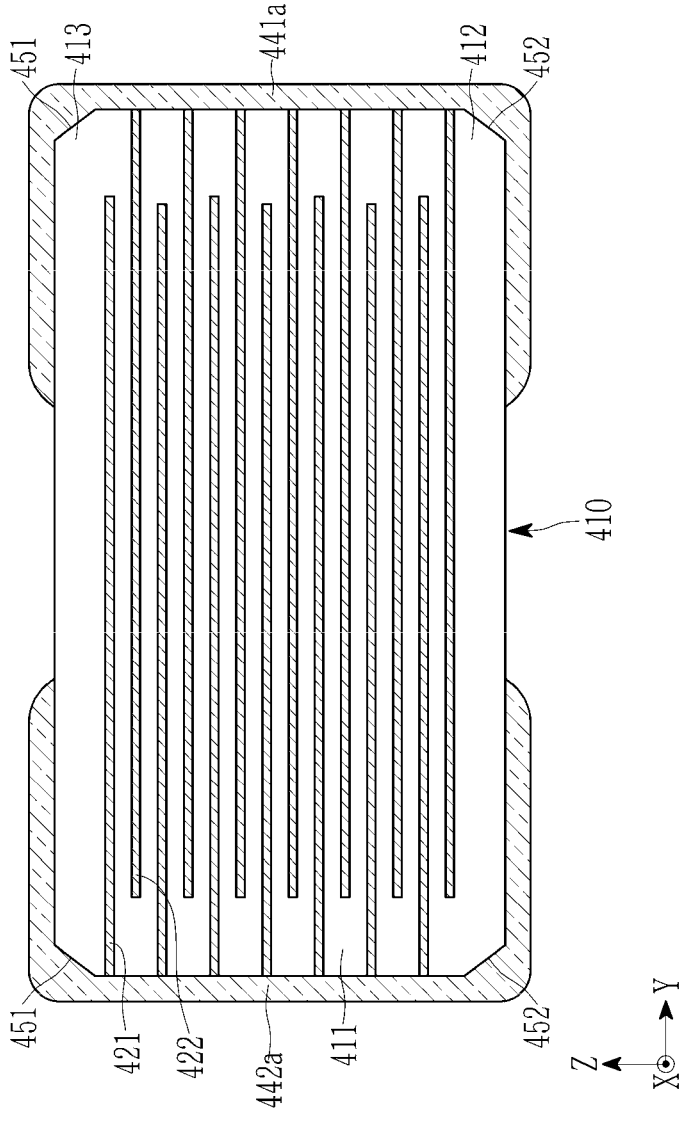

Referring to FIG. 24, electrode layers 441a and 442a may be formed above or on the body 410. For example, the electrode layers 441a and 442a may be formed on one surface or both opposing surfaces of the body 410. Specifically, the electrode layers 441a and 442a may be formed on one surface of the body 410 and at least one surface connected to the one surface of the body 410.

For example, the electrode layer 441a may be formed on a third surface S3, the first surface S1 connected to the third surface S3, and the second surface S2 of the body 410. Additionally, the electrode layer 442a may be formed on a fourth surface S4, the first surface S1 connected to the fourth surface S4, and the second surface S2 of the body 410.

As another example, the electrode layer may be formed on the third surface S3 and the second surface S2 connected to the third surface S3 of the body 410. Additionally, the electrode layer may be formed on the fourth surface S4 and the second surface S2 connected to the fourth surface S4 of the body 410.

The electrode layers 441a and 442a may be formed by applying a conductive paste including nickel and firing the applied conductive paste.

Figure 25:
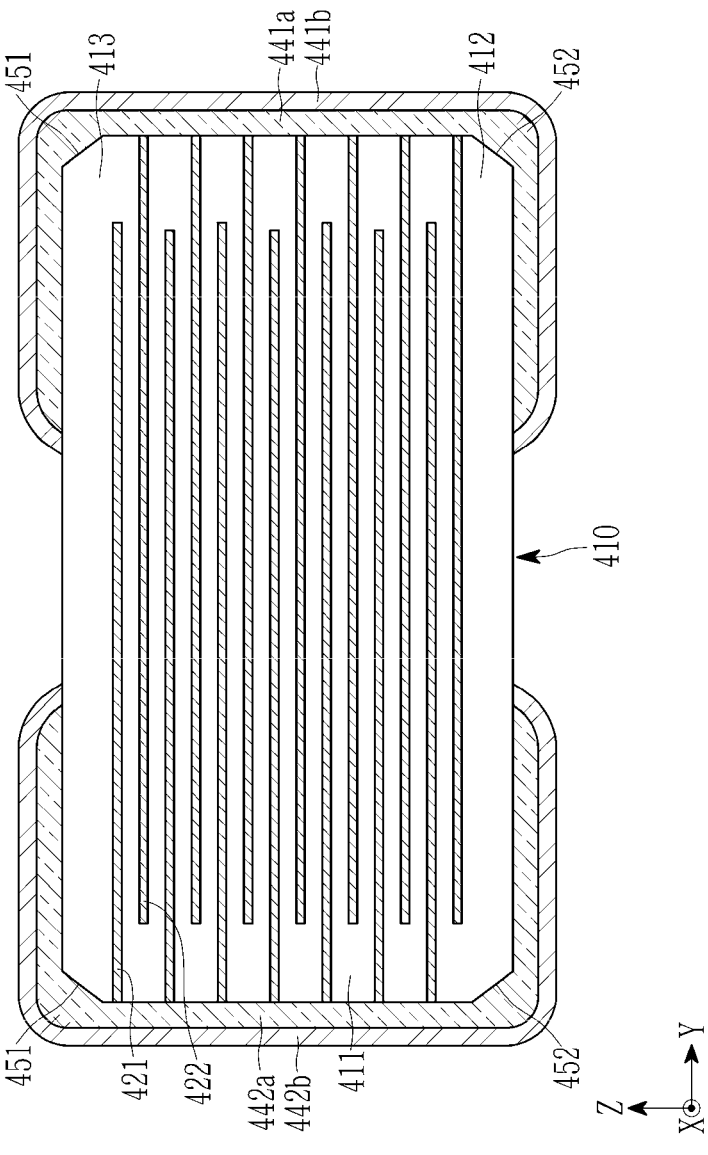

Referring to FIG. 25, first plating layers 441b and 442b may be formed on the electrode layers 441a and 442a. The first plating layers 441b and 442b may include nickel, and may be formed by an electrical plating method or a chemical plating method. Hereafter, referring to FIG. 1, the multi-layered ceramic capacitor 100 may be formed by forming the second plating layer on the first plating layer 441b or 442b. The second plating layer may include copper or tin, and may be formed by an electrical plating method or a chemical plating method.

FIGS. 26 to 29 are process diagrams showing a method for manufacturing the multi-layered ceramic capacitor shown in FIG. 15. Hereinafter, the method for manufacturing the multi-layered ceramic capacitor shown in FIG. 15 of the present disclosure will be described with reference to FIGS. 26 to 29.

Figure 26:
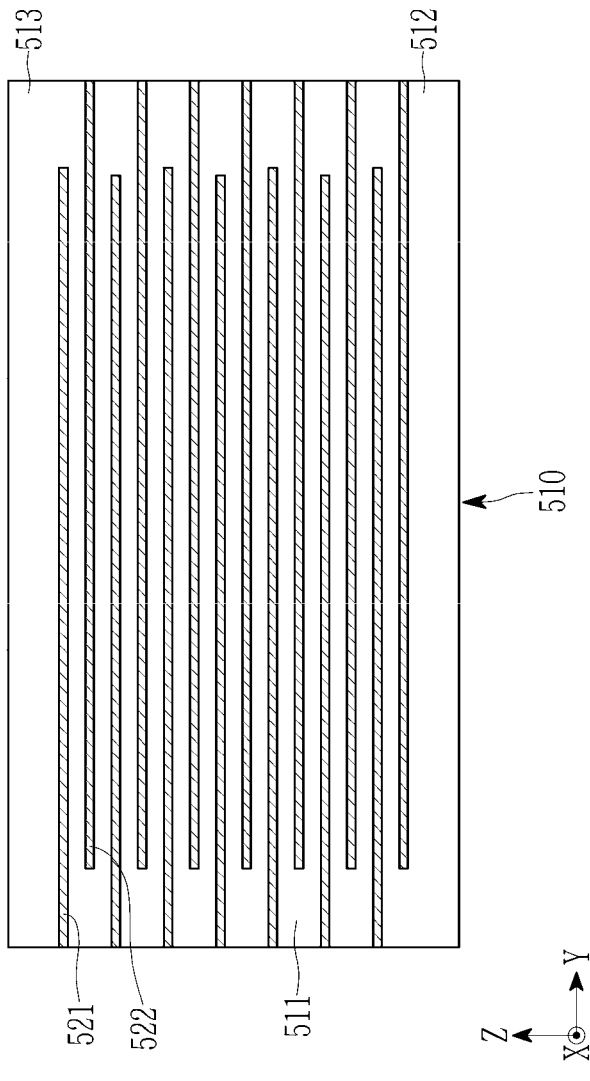
FIGS. 26 to 29 are process diagrams showing a method for manufacturing the multi-layered ceramic capacitor shown in FIG. 15.

As shown in FIG. 26, a sheet printed with a paste including a conductive metal at a predetermined thickness may be stacked in the Z direction (the thickness direction) on one surface of a ceramic green sheet made of a dielectric layer so that a body 510 including dielectric layers 511 and first and second internal electrodes 521 and 522 interposed between the dielectric layers 511 is provided. A first cover portion 512 and a second cover portion 513 may be formed by stacking dielectric layers that do not include the internal electrode at upper and lower portions of the body 510. In this case, an identification portion (not shown) may be formed as necessary.

Figure 27:
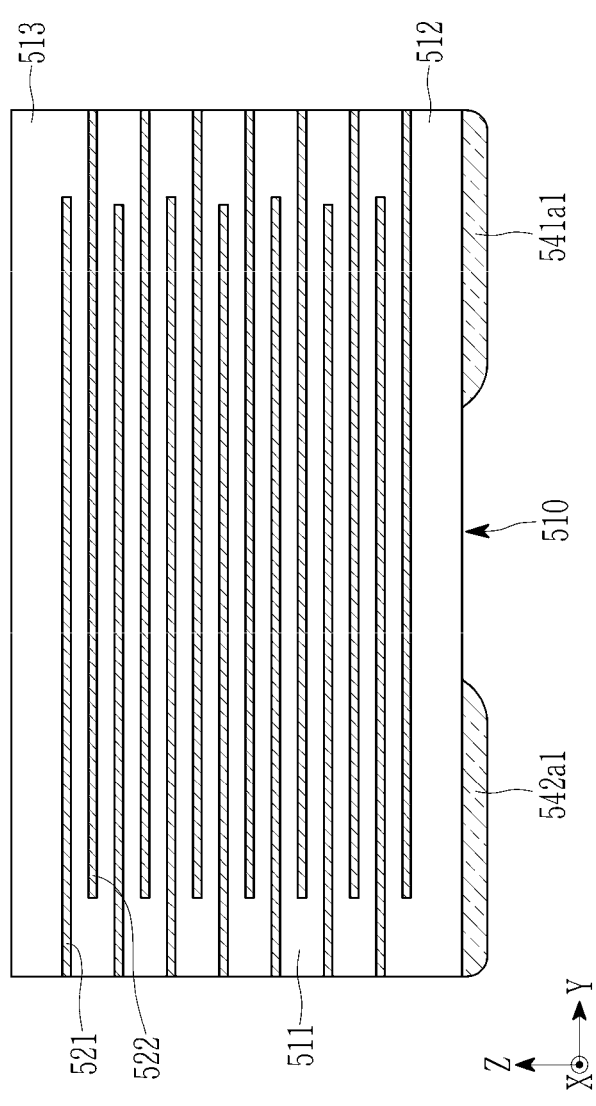

Referring to FIG. 27, electrode layers 541*a*1 and 542*a*1 may be formed above or on the body 510. For example, the electrode layers 541*a*1 and 542*a*1 may be formed on one surface of the body 510. Specifically, the electrode layers 541*a*1 and 542*a*1 may be formed on a lower surface of the body 510. The electrode layers 541*a*1 and 542*a*1 may be formed by applying a conductive paste including nickel and firing the applied conductive paste.

Figure 28:
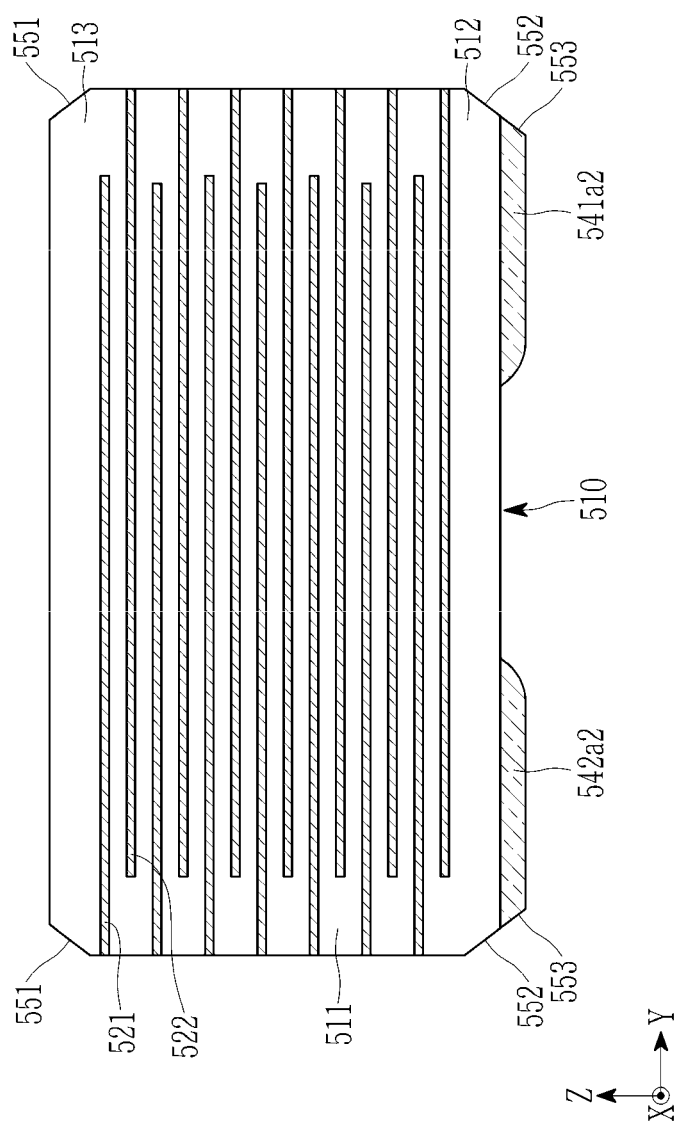

Referring to FIG. 28, after the electrode layers 541*a*1 and 542*a*1 are formed, first and second inclined portions 551 and 552 may be formed by chamfering corner regions along the X direction (the length direction) and the Y direction (the width direction) of upper and lower surfaces of the body 510. Specifically, the first and second inclined portions 551 and 552 may be formed by chamfering the corner regions along the X direction (the length direction) and the Y direction (the width direction) of a first surface S1 and a second surface S2 of the body 510. Here, the electrode layers 541*a*1 and 542*a*1 of FIG. 27 may be chamfered together with the body 510 so that electrode layers 541*a*2 and 542*a*2 including a third inclined portion 553 are formed.

Figure 29:
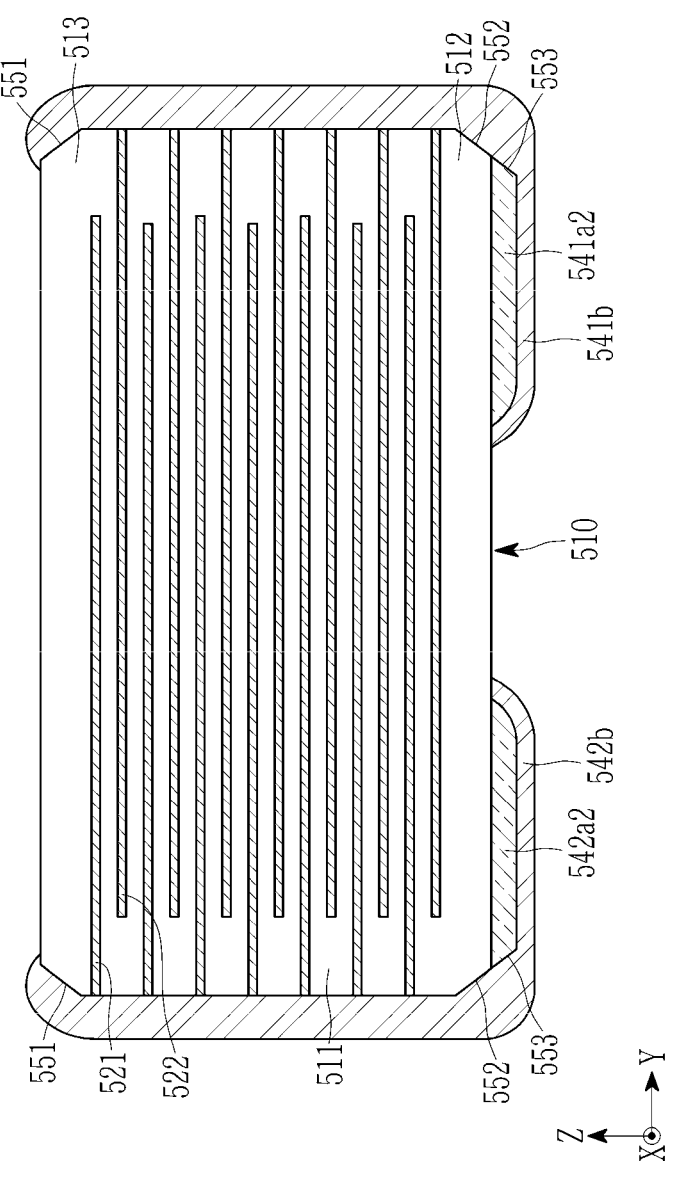

Referring to FIG. 29, first plating layers 541*b* and 542*b* may be formed on the electrode layers 541*a*1 and 542*a*1. The first plating layers 541*b* and 542*b* may include nickel, and may be formed by an electrical plating method or a chemical plating method. Hereafter, referring to FIG. 15, the multi-layered ceramic capacitor 300 may be formed by forming the second plating layer on the first plating layer 541*b* or 542*b*. The second plating layer may include copper or tin, and may be formed by an electrical plating method or a chemical plating method.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100, 200, 300: multi-layered ceramic capacitor
110, 210, 310, 410, 510: body
111, 211, 311, 411, 511: dielectric layer
112, 212, 312, 113, 213, 313, 412, 413, 512, 513: cover portion
121, 122, 221, 222, 321, 322, 421, 422, 521, 522: internal electrode
141, 142, 241, 242, 341, 342, 441, 442: external electrode
141*a*, 142*a*, 241*a*, 242*a*, 341*a*, 342*a*, 441*a*, 442*a*, 541*a*1, 542*a*1, 541*a*2, 542*a*2: electrode layer
141*b*, 142*b*, 241*b*, 242*b*, 341*b*, 342*b*, 441*b*, 442*b*, 541*b*, 542*b*: first plating layer
141*c*, 142*c*, 241*c*, 242*c*, 341*c*, 342*c*: second plating layer
151, 152, 251, 252, 351, 352, 451, 452, 551, 552: inclined portion

What is claimed is:

1. A multi-layered ceramic capacitor, comprising:
   a body including: dielectric layers stacked in a first direction and a first internal electrode and a second internal electrode interposed between the dielectric layers; a first surface and a second surface facing each other in the first direction; a third surface and a fourth surface facing each other in a second direction perpendicular to the first direction; and a fifth surface and a sixth surface facing each other in a third direction perpendicular to the first direction and the second direction;
   a first external electrode disposed on the third surface of the body and electrically connected to the first internal electrode; and
   a second external electrode disposed on fourth surface of the body and electrically connected to the second internal electrode,
   wherein the body includes a first inclined portion in which at least one of edge regions of the first surface are chamfered and a second inclined portion in which at least one of edge regions of the second surface are chamfered,
   a ratio of a first length of the first inclined portion along the second direction to a second length of the second inclined portion along the second direction is 0.67 to 1.5,
   a ratio of a third length of the first inclined portion along the first direction to a fourth length of the second inclined portion along the first direction is 0.4 to 2.5,
   a ratio of the third length to a fifth length from the first surface to the second surface along the first direction is 0.17 to 0.42,
   a ratio of the fourth length to the fifth length is 0.17 to 0.42, and
   the first inclined portion and the second inclined portion each has a linear shape in a cross section defined by the first direction and the second direction.

2. The multi-layered ceramic capacitor of claim 1, wherein each of the first external electrode and the second external electrode comprises:
   an electrode layer;
   a first plating layer disposed on the electrode layer; and
   a second plating layer disposed on the first plating layer.

3. The multi-layered ceramic capacitor of claim 2, wherein the first plating layer includes nickel.

4. The multi-layered ceramic capacitor of claim 2, wherein the second plating layer includes copper or tin.

5. The multi-layered ceramic capacitor of claim 1, wherein the first external electrode is disposed on the third surface and extends to the first surface and the second surface, and the second external electrode is disposed on the fourth surface and extends to the first surface and the second surface.

6. The multi-layered ceramic capacitor of claim 1, wherein the first external electrode is disposed on the third surface and extends to the second surface, and the second external electrode is disposed on the fourth surface and extends to the second surface.

7. The multi-layered ceramic capacitor of claim 6, wherein each of the first external electrode and the second external electrode comprises:
   an electrode layer disposed on the second surface;
   a first plating layer disposed on the electrode layer; and
   a second plating layer disposed on the first plating layer.

8. The multi-layered ceramic capacitor of claim 7, wherein the electrode layer includes a third inclined portion in which a corner region is chamfered.

9. The multi-layered ceramic capacitor of claim 8, wherein the third inclined portion is connected to the second inclined portion.

10. The multi-layered ceramic capacitor of claim 1, wherein the first inclined portion is inclined toward a central portion of the body as the first inclined portion goes toward the outside of the body along the first direction.

11. The multi-layered ceramic capacitor of claim 1, wherein the first inclined portion extends along the third direction.

12. The multi-layered ceramic capacitor of claim 11, wherein the first inclined portion extends to surround corner portions of the first surface.

13. The multi-layered ceramic capacitor of claim 1, wherein the second inclined portion is inclined toward a central portion of the body as the second inclined portion goes toward the outside of the body along the first direction.

14. The multi-layered ceramic capacitor of claim 1, wherein the second inclined portion extends along the third direction.

15. The multi-layered ceramic capacitor of claim 14, wherein the second inclined portion extends to surround corner portions of the second surface.

16. The multi-layered ceramic capacitor of claim 1, wherein a thickness along the first direction is 100 μm or less.

17. A multi-layered ceramic capacitor, comprising:
a body including: dielectric layers stacked in a first direction and a first internal electrode and a second internal electrode interposed between the dielectric layers; a first surface and a second surface facing each other in the first direction; a third surface and a fourth surface facing each other in a second direction perpendicular to the first direction; and a fifth surface and a sixth surface facing each other in a third direction perpendicular to the first direction and the second direction;
a first external electrode disposed on the third surface of the body and electrically connected to the first internal electrode; and
a second external electrode disposed on the fourth surface of the body and electrically connected to the second internal electrode and is disposed to face the first external electrode in the second direction,
wherein the body includes a first inclined portion in which at least one of edge regions of the first surface is chamfered and a second inclined portion in which at least one of edge regions of the second surface is chamfered,
a ratio of a first length of the first inclined portion along the third direction to a second length of the second inclined portion along the third direction is 0.67 to 1.5,
a ratio of a third length of the first inclined portion along the first direction to a fourth length of the second inclined portion along the first direction is 0.4 to 2.5,
a ratio of the third length to a fifth length from the first surface to the second surface along the first direction is 0.17 to 0.42,
a ratio of the fourth length to the fifth length is 0.17 to 0.42, and
the first inclined portion and the second inclined portion each has a linear shape in a cross section defined by the first direction and the second direction.

18. The multi-layered ceramic capacitor of claim 17, wherein each of the first external electrode and the second external electrode comprises:
an electrode layer;
a first plating layer disposed on the electrode layer; and
a second plating layer disposed on the first plating layer.

19. The multi-layered ceramic capacitor of claim 17, wherein the first inclined portion and the second inclined portion extend along the second direction.

20. The multi-layered ceramic capacitor of claim 17, wherein the first inclined portion and the second inclined portion are inclined toward a central portion of the body as the first inclined portion and the second inclined portion go toward the outside of the body along the first direction.

* * * * *